United States Patent
Pursifull et al.

(10) Patent No.: US 9,657,659 B2
(45) Date of Patent: May 23, 2017

(54) METHOD FOR REDUCING AIR FLOW IN AN ENGINE AT IDLE

(71) Applicant: Ford Global Technologies, LLC, Dearborn, MI (US)

(72) Inventors: Ross Dykstra Pursifull, Dearborn, MI (US); Eric Luehrsen, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 14/628,029

(22) Filed: Feb. 20, 2015

(65) Prior Publication Data

US 2016/0245199 A1    Aug. 25, 2016

(51) Int. Cl.
| | |
|---|---|
| F02D 41/08 | (2006.01) |
| F02D 41/00 | (2006.01) |
| F01M 13/00 | (2006.01) |
| F02D 41/22 | (2006.01) |
| F02M 35/10 | (2006.01) |
| F02B 33/00 | (2006.01) |
| F02M 35/104 | (2006.01) |

(52) U.S. Cl.
CPC ..... *F02D 41/0007* (2013.01); *F01M 13/0011* (2013.01); *F02B 33/00* (2013.01); *F02D 41/08* (2013.01); *F02D 41/221* (2013.01); *F02M 35/10222* (2013.01); *F02M 35/10229* (2013.01); *F02D 41/0025* (2013.01); *F02D 2250/41* (2013.01); *F02M 35/104* (2013.01); *Y02T 10/144* (2013.01); *Y02T 10/40* (2013.01)

(58) Field of Classification Search
CPC .................................................. F02M 35/104
USPC .... 701/103; 123/574, 572, 516, 518, 339.23
See application file for complete search history.

(56) References Cited

U.S. PATENT DOCUMENTS

| | | | |
|---|---|---|---|
| 3,961,813 | A | 6/1976 | Thomas |
| 4,056,085 | A | 11/1977 | Nowroski et al. |
| 4,169,432 | A | 10/1979 | White |
| 4,530,210 | A | 7/1985 | Yamazaki |

(Continued)

FOREIGN PATENT DOCUMENTS

| | | |
|---|---|---|
| EP | 1614871 A2 | 1/2006 |
| EP | 1959117 A1 | 12/2008 |

(Continued)

OTHER PUBLICATIONS

Pursifull R., "Increasing Crankcase Ventilation Flow Rate Via Active Flow Control," U.S. Appl. No. 14/706,689, filed May 7, 2015, 58 pages.

(Continued)

*Primary Examiner* — Mahmoud Gimie
(74) *Attorney, Agent, or Firm* — Julia Voutyras; McCoy Russell LLP

(57) ABSTRACT

Methods and systems are provided for controlling air ingestion in an engine during idle conditions. One example approach includes adjusting an opening of a common shut-off valve via an electronic controller, the common shut-off valve regulating each of motive flow through an aspirator and crankcase ventilation (CV) flow from a crankcase. As such, the common shut-off valve may be closed by the electronic controller during engine idle to cease each of the motive flow through the aspirator and the CV flow from the crankcase.

21 Claims, 8 Drawing Sheets

(56) References Cited

U.S. PATENT DOCUMENTS

| | | | |
|---|---|---|---|
| 5,005,550 A | 4/1991 | Bugin, Jr. et al. | |
| 5,056,496 A | 10/1991 | Morino et al. | |
| 5,063,737 A | 11/1991 | Lopez-Crevillen et al. | |
| 5,205,848 A | 4/1993 | Blanc et al. | |
| 5,215,066 A | 6/1993 | Narishige et al. | |
| 5,349,935 A | 9/1994 | Mezger et al. | |
| 5,408,866 A | 4/1995 | Kawamura et al. | |
| 5,499,616 A | 3/1996 | Enright | |
| 5,546,755 A | 8/1996 | Krieger | |
| 5,577,471 A | 11/1996 | Ward | |
| 5,592,923 A | 1/1997 | Machida | |
| 5,629,477 A | 5/1997 | Ito | |
| 5,722,376 A | 3/1998 | Sweeten | |
| 5,792,949 A | 8/1998 | Hewelt et al. | |
| 5,947,093 A | 9/1999 | Ward | |
| 5,970,957 A | 10/1999 | Fried et al. | |
| 5,992,156 A | 11/1999 | Isobe et al. | |
| 6,047,670 A | 4/2000 | Stella et al. | |
| 6,049,176 A | 4/2000 | Aoki et al. | |
| 6,138,644 A | 10/2000 | Saruwatari et al. | |
| 6,213,108 B1 | 4/2001 | Boyer et al. | |
| 6,290,296 B1 | 9/2001 | Beggs | |
| 6,305,365 B1 | 10/2001 | Maeoka et al. | |
| 6,446,618 B1 | 9/2002 | Hill | |
| 6,557,537 B2 | 5/2003 | Ikeda et al. | |
| 6,637,416 B2 | 10/2003 | Wakahara | |
| 6,681,583 B2 | 1/2004 | Taguchi | |
| 6,688,104 B2 | 2/2004 | Baeuerle et al. | |
| 6,779,388 B2 | 8/2004 | Baeuerle et al. | |
| 6,892,715 B2 * | 5/2005 | Norrick | F02M 25/06 123/563 |
| 6,968,732 B2 | 11/2005 | Nakoji | |
| 7,007,682 B2 | 3/2006 | Takahashi et al. | |
| 7,011,690 B2 | 3/2006 | Altvater et al. | |
| 7,100,589 B2 | 9/2006 | Toriyama | |
| 7,121,270 B1 | 10/2006 | Plotnikov | |
| 7,235,177 B2 | 6/2007 | Herman et al. | |
| 7,275,527 B2 | 10/2007 | Bruchner et al. | |
| 7,316,223 B2 | 1/2008 | Wakahara | |
| 7,316,227 B2 | 1/2008 | Zhao et al. | |
| 7,404,396 B2 | 7/2008 | Toriyama et al. | |
| 7,431,023 B2 | 10/2008 | Kavanagh et al. | |
| 7,506,641 B2 | 3/2009 | Ishida | |
| 7,523,748 B2 | 4/2009 | Hirano et al. | |
| 7,552,902 B2 | 6/2009 | Tsuge | |
| 7,743,752 B2 | 6/2010 | Kerns et al. | |
| 7,886,727 B2 | 2/2011 | Ulrey et al. | |
| 8,056,540 B2 | 11/2011 | DeBastos et al. | |
| 8,341,936 B2 | 1/2013 | Zhang | |
| 8,360,038 B2 | 1/2013 | Monros | |
| 8,439,017 B2 | 5/2013 | Peters et al. | |
| 9,027,536 B2 | 5/2015 | Pursifull et al. | |
| 2002/0066444 A1 | 6/2002 | Ikeda et al. | |
| 2004/0244368 A1 | 12/2004 | Yang et al. | |
| 2005/0263144 A1 | 12/2005 | Toriyama | |
| 2007/0227515 A1 | 10/2007 | Uchida | |
| 2007/0295303 A1 * | 12/2007 | Hirooka | B60T 17/02 123/339.23 |
| 2009/0090331 A1 | 4/2009 | Pursifull | |
| 2009/0090337 A1 | 4/2009 | Asanuma et al. | |
| 2009/0308364 A1 | 12/2009 | Konohara | |
| 2009/0320809 A1 | 12/2009 | Ruppel et al. | |
| 2010/0180872 A1 | 7/2010 | Monros | |
| 2011/0017155 A1 | 1/2011 | Jacob | |
| 2013/0025564 A1 | 1/2013 | Setiadi | |
| 2014/0165931 A1 | 6/2014 | Pursifull | |
| 2014/0216421 A1 | 8/2014 | Pifher et al. | |
| 2014/0224232 A1 | 8/2014 | Hotta | |
| 2014/0318514 A1 | 10/2014 | Pursifull | |
| 2015/0053188 A1 * | 2/2015 | Kuribayashi | F02B 37/183 123/574 |

FOREIGN PATENT DOCUMENTS

| | | |
|---|---|---|
| EP | 2182185 A1 | 10/2009 |
| JP | S5918017 A | 1/1984 |
| JP | S60190663 A | 9/1985 |
| JP | S641616 A | 1/1989 |

OTHER PUBLICATIONS

Pursifull R., "Method for Crankcase Ventilation in a Boosted Engine," U.S. Appl. No. 14/743,280, filed Jun. 18, 2015, 52 pages.

* cited by examiner

METHOD FOR REDUCING AIR FLOW IN AN ENGINE AT IDLE

FIELD

The present application relates to methods for controlling air flow in an internal combustion engine during engine idle.

BACKGROUND AND SUMMARY

Engine systems in vehicles may be designed to utilize smaller amounts of fuel during idle conditions. These smaller amounts of fuel may be further reduced by prudently managing electrical loads during idle as well as by using alternators with higher efficiency. Further still, by generating electrical power from regenerative braking instead of combusting fuel for operating an engine-driven electrical generator, fuel quantities may be additionally diminished during idling.

As fuel consumption during idle is reduced, a corresponding decrease in intake air flow may be desired. As such, intake air flow during idle may be actively regulated via an electronic throttle in an engine intake. However, passive devices in the engine system may also affect engine air flow during idle. For example, vehicle systems may include one or more aspirators coupled in the engine system to harness engine air flow for generating vacuum. Motive flow through the one or more aspirators may bypass the electronic throttle and flow into the engine intake. In another example, blow-by gases in a crankcase may be received in the engine intake during idle via a crankcase ventilation (CV) system including a passive crankcase ventilation (CV) valve. Specifically, blow-by gases may flow through a smaller annular opening (e.g., a low flow orifice) in the CV valve even though the CV valve is substantially closed during idle.

The inventors herein have recognized the above issue and identified an approach to at least partly address the issue. In one example, a method for a boosted engine comprises adjusting, via an electronic controller, an opening of a common shut-off valve (CSOV) based on engine idling conditions, and each of a motive flow through an aspirator and a crankcase ventilation flow from a crankcase, the motive flow and the crankcase ventilation flow combined together and flowing through the CSOV when the CSOV is open. In this way, air flow from passive devices such as the CV valve and the aspirator can be significantly reduced during engine idle.

For example, a boosted engine system may include a compressor coupled in an intake passage and an aspirator coupled in a bypass passage. The bypass passage may be fluidically coupled at a first end to the intake passage upstream of the compressor. Further, a second end of the bypass passage may be fluidically coupled to an intake manifold of the boosted engine via a common shut-off valve (CSOV). A crankcase of the boosted engine system may be fluidically coupled to the intake manifold via a conduit. The conduit may enable evacuation of blow-by gases via a passive crankcase ventilation (CV) valve. The conduit flowing CV gases and the bypass passage flowing aspirator air flow may intersect upstream of the CSOV. As such, motive air flow received via the aspirator and blow-by gases from the crankcase may be combined together and a mixture of motive air flow and blow-by gases may stream through the CSOV, when open, into the intake manifold. Further, the CSOV can modulate air flow from each of the aspirator and the crankcase into the intake manifold. An engine controller may be configured to adjust a position of the CSOV based on engine conditions. Specifically, the CSOV may be adjusted to close (e.g., fully close) when the engine is idling. By closing the CSOV, the flow of air from the aspirator and blow-by gases from the crankcase into the intake manifold may be simultaneously stopped.

In this way, engine air ingestion during idle conditions may be reduced. Specifically, air ingestion from passive devices such as a CV valve and/or an aspirator may be substantially decreased during engine idling allowing a significant decrease in a rate of fuel consumption. By employing a common shut-off valve to regulate both air flow received from the aspirator and blow-by gases from the CV valve, a simpler control algorithm for the shut-off valve may be deployed. A serendipitous benefit of using the common shut-off valve may include utilizing aspirators with higher motive flow rates for increased vacuum generation. Further, the presence of the CSOV may also enable an increase in the size of a low flow orifice in the CV valve. By increasing the size of the low flow orifice, a higher evacuation rate of blow-by gases may be achieved when the common shut-off valve is open and manifold vacuum is deeper. Overall, engine performance may be improved while lowering operational costs due to the reduction in fuel consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
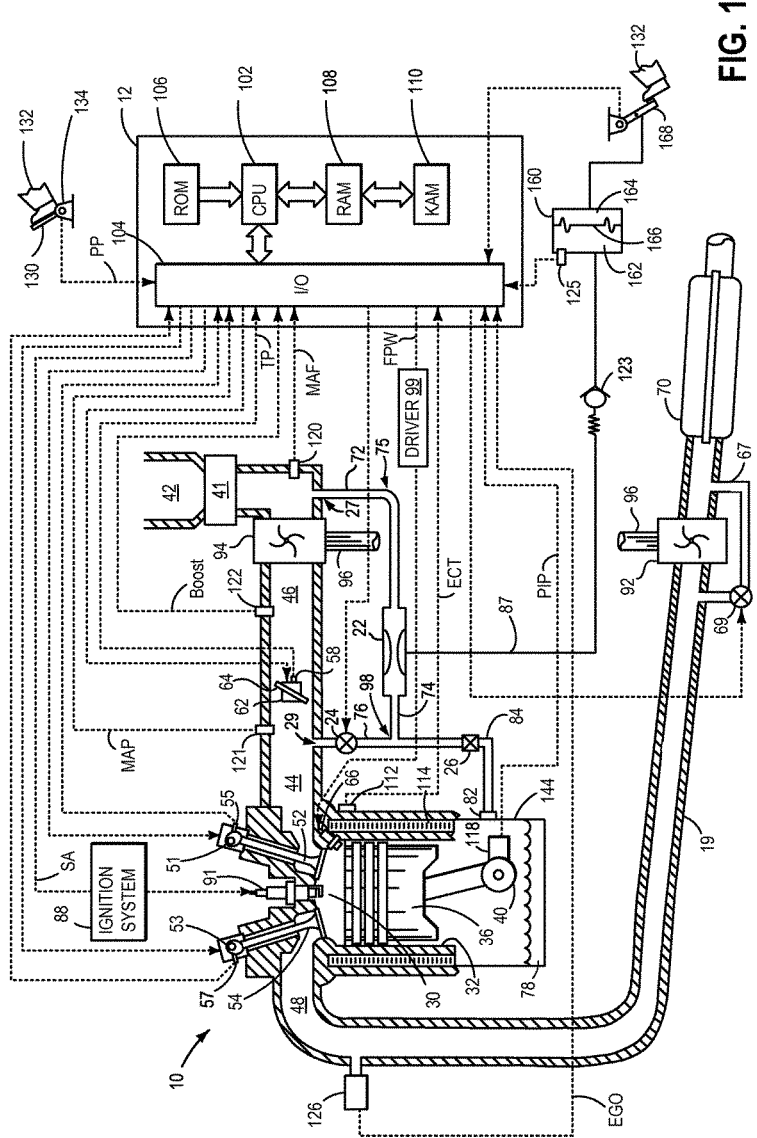
FIG. 1 schematically depicts an example embodiment of a boosted engine system including a common shut-off valve (CSOV) according to the present disclosure.
Figure 2:
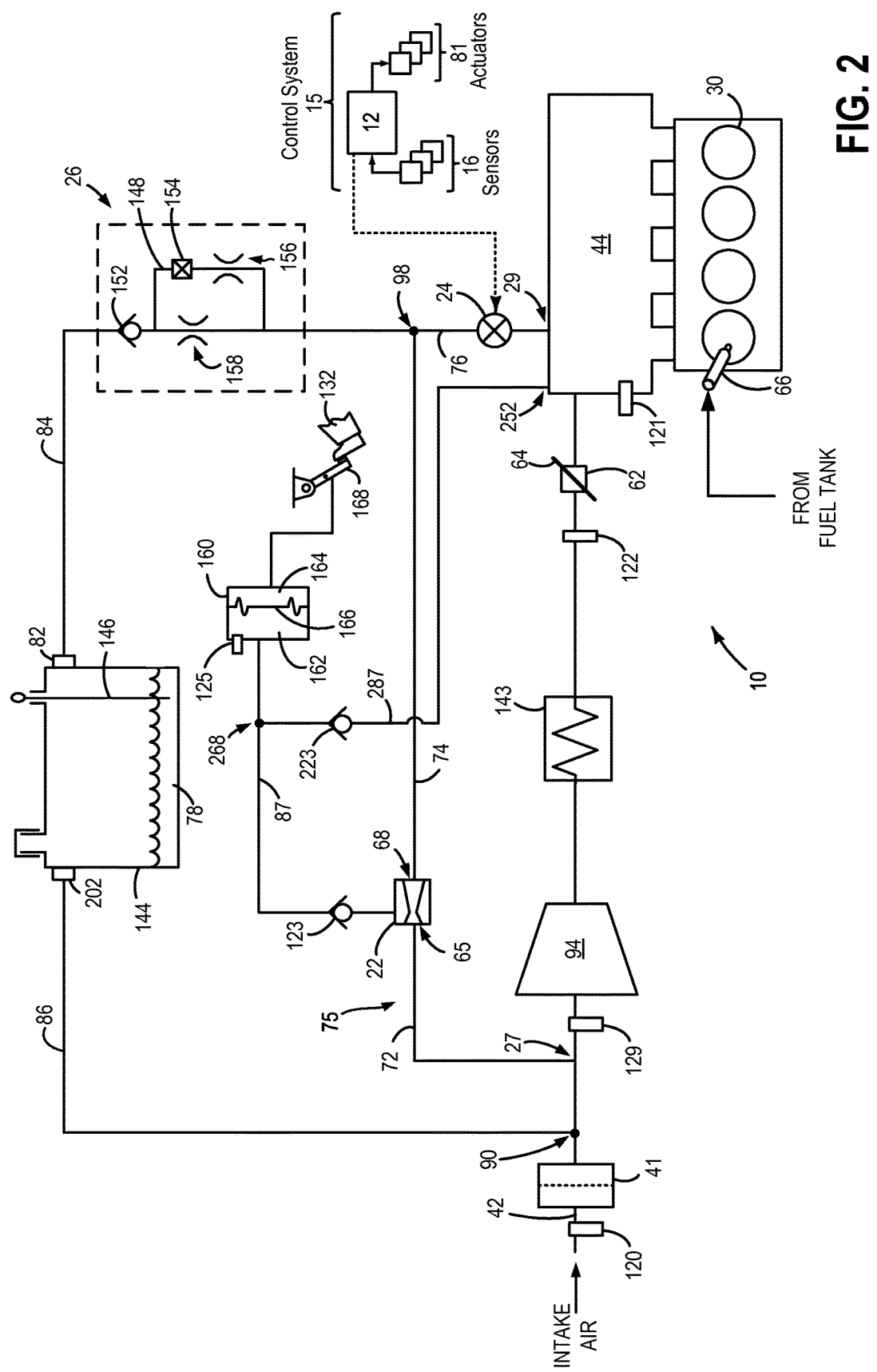
FIG. 2 portrays a schematic layout of the boosted engine system of FIG. 1.

The following description relates to systems and methods for reducing air flow in a boosted engine system, such as the engine system of FIGS. 1 and 2, during idle conditions. The engine system may ingest air from distinct sources (other than intake air flow) such as from a vacuum generating aspirator, a crankcase, a fuel vapor canister, etc. A common shut-off valve (CSOV) may be included in a common channel, the CSOV capable of regulating flow through each of the common channel, the aspirator, and a crankcase ventilation (CV) valve. The common channel may stream air flow from each of an aspirator and from the CV valve into an intake manifold of the boosted engine system, based on engine conditions. The CSOV may be adjusted by a controller to a fully closed position in response to idling conditions in the boosted engine system (FIG. 6) and air flow through the aspirator may be ceased along with CV flow. When the engine is not idling and pressure in the intake manifold is lower than barometric pressure, an opening of the CSOV may be increased to allow motive flow through the aspirator and to conduct blow-by gases from the crankcase (FIG. 4) into the intake manifold. When the pressure in the intake manifold is higher than barometric pressure, and the CSOV is opened during non-idling conditions, CV flow, including blow-by gases, may not flow into the intake manifold. Further, a reverse air flow may occur through the aspirator. Specifically, air from the intake manifold may flow to upstream of the compressor through the aspirator (FIG. 5). An alternate embodiment of the boosted engine system, shown in FIG. 3, may not allow the reverse flow through the aspirator. An example operation of the CSOV and resulting air flow is depicted in FIG. 7. The controller may also be configured to perform a control routine, such as the routine of FIG. 8, to determine if the CSOV is degraded. In this way, excessive air flow from passive devices into the engine intake manifold may be diminished during engine idle.

Referring now to FIG. 1, it shows a schematic depiction of a spark ignition internal combustion engine 10. Engine 10 may be controlled at least partially by a control system (such as control system 15 of FIG. 2) including controller 12 and by input from a vehicle operator 132 via an input device 130. In this example, input device 130 includes an accelerator pedal and a pedal position sensor 134 for generating a proportional pedal position signal PP.

Combustion chamber 30 (also known as, cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10. Crankshaft 40 is shown enclosed within crankcase 144 which also contains lubricating oil 78.

Unburned fuel and other combustion products may escape past piston 36 into the crankcase 144. The resulting gases in the crankcase, often referred to as "blow-by" gases, may contribute to the formation of sludge in the engine oil supply. Further, blow-by gases may excessively pressurize the crankcase 144, resulting in undesirable leakage of an oil pan gasket and crankcase seals.

To reduce these issues, engine 10 may include a crankcase ventilation (CV) system coupled to the intake, which serves to vent blow-by gases from the crankcase 144 to the intake manifold 44. The CV system may include a CV valve 26 intermediate the crankcase 144 and the intake manifold 44, to regulate the flow of blow-by gases from the crankcase to the intake manifold. As shown, CV valve 26 is fluidically coupled to conduit 84, and conduit 84, in turn, is fluidically coupled to crankcase 144 via an oil separator 82. Conduit 84 is also fluidically coupled to intake manifold 44 via channel 76 and common shut-off valve 24. Further still, conduit 84 may fluidically communicate with bypass passage 75, as will be described herein. Oil particles present in blow-by gases (also termed, crankcase vapors) may be selectively filtered via oil separator 82 before these crankcase vapors are delivered to intake manifold 44. In one example, the crankcase ventilation system may operate continuously. In another example, the crankcase ventilation system may operate intermittently.

Combustion chamber 30 may receive intake air from intake manifold 44 via intake passage 42 and may exhaust combustion gases via exhaust manifold 48 and exhaust passage 19. Intake passage 42 includes air cleaner 41 for filtering intake air before delivery to cylinder 30. Intake manifold 44 and exhaust manifold 48 can selectively communicate with combustion chamber 30 via respective intake valve 52 and exhaust valve 54. In some embodiments, combustion chamber 30 may include two or more intake valves and/or two or more exhaust valves.

In the example of FIG. 1, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternate embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 99. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 91 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 94 arranged along intake passage 42. For a turbocharger, compressor 94 may be at least partially driven by an exhaust turbine 92 (e.g. via a shaft) arranged along exhaust passage 19. Compressor 94 draws air from intake passage 42 to supply boost chamber 46. Exhaust gases spin exhaust turbine 92 which is coupled to compressor 94 via shaft 96. For a supercharger, compressor 94 may be at least partially driven by the engine and/or an electric machine, and may not include an exhaust turbine. Thus, the amount of compression provided to one or more cylinders of the engine via a turbocharger or supercharger may be varied by controller 12.

Boost pressure sensor 122 may be coupled to boost chamber 46 downstream of compressor 94 for providing signal "Boost" to controller 12.

A wastegate 69 may be coupled across exhaust turbine 92 in a turbocharger. Specifically, wastegate 69 may be included in a bypass passage 67 coupled between an inlet and outlet of the exhaust turbine 92. By adjusting a position of wastegate 69 via controller 12, an amount of boost provided by the exhaust turbine may be controlled.

Intake manifold 44 is shown communicating with throttle 62 having a throttle plate 64. In this particular example, the position of throttle plate 64 may be varied by controller 12 via a signal provided to an electric motor or actuator (not shown in FIG. 1) included with throttle 62, a configuration that is commonly referred to as electronic throttle control (ETC). Throttle position may be varied by the electric motor via a shaft. Throttle 62 may control air flow from intake boost chamber 46 to intake manifold 44 and combustion chamber 30 (and other engine cylinders). The position of throttle plate 64 may be provided to controller 12 by throttle position signal TP from throttle position sensor 58.

Aspirator 22 is shown coupled in bypass passage 75 across from each of intake throttle 62 and compressor 94. Bypass passage 75 includes a first passage 72 and a second passage 74 with aspirator 22 fluidically coupling first passage 72 to second passage 74. Bypass passage 75 may divert a portion of intake air received from upstream of compressor 94 to intake manifold 44 via aspirator 22. The portion of air diverted from upstream of compressor 94 may flow into first end 27 of bypass passage 75, through aspirator 22, and may exit into intake manifold 44 downstream of intake throttle 62 via opening 29. Air flow through aspirator 22 creates a low pressure region within the aspirator 22, thereby providing a vacuum source for vacuum reservoirs and vacuum consumption devices such as fuel vapor canisters, brake boosters, etc. Aspirators (which may alternatively be referred to as ejectors, venturis, jet pumps, and eductors) are, therefore, passive vacuum generating devices which can provide low-cost vacuum generation when utilized in engine systems. The amount of vacuum generated may be dependent on a motive air flow rate through aspirator 22. The motive flow rate through aspirator 22 may depend on a size of the aspirator 22, manifold pressure in the intake manifold 44 as well as a position of a common shut-off valve 24.

In alternative embodiments, bypass passage 75 may divert a portion of compressed air from downstream of compressor 94 to aspirator 22. Thus, aspirator 22 may receive pressurized air as motive flow instead of air from upstream of compressor 94.

In the depicted embodiment, a suction inlet (not indicated) of aspirator 22 is fluidically coupled to brake booster 160, which in turn may be coupled to vehicle wheel brakes (not shown). Specifically, brake booster 160 is fluidically coupled to aspirator 22 via conduit 87. Brake booster 160, including a brake booster vacuum reservoir 162 and a working chamber 164, may be coupled to intake manifold 44 (and/or intake passage 42) via check valve 123 and aspirator 22. Check valve 123 coupled in conduit 87 allows air to flow from brake booster 160 towards aspirator 22 and restricts air flow to brake booster 160 from aspirator 22. Brake booster 160 may include vacuum reservoir 162 (or vacuum cavity) behind a diaphragm 166 of the brake booster for amplifying a force provided by a vehicle operator 132 via a brake pedal 168 for applying vehicle wheel brakes (not shown). A vacuum level at brake booster 160 may be estimated by pressure sensor 125. Brake booster 160 works by using a pressure difference across the diaphragm 166. By allowing atmospheric air to enter the working chamber 164, a differential pressure may be formed across diaphragm 166, and a force may be created to assist the force applied to brake pedal 168. Though the depicted embodiment shows the brake booster 160 alone as the vacuum consumer coupled to aspirator 22, other vacuum consumers such as a fuel vapor canister, a distinct vacuum reservoir etc., may also receive vacuum from aspirator 22.

Further, though not shown in FIG. 1, brake booster 160 may also receive vacuum from intake manifold 44 by a separate conduit.

Second passage 74 of bypass passage 75 is shown fluidically coupled to conduit 84 from crankcase 144 at junction 98. Thus, bypass passage 75 merges with conduit 84 at junction 98. In other words, the portion of air diverted from upstream of compressor 94 through aspirator 22 via bypass passage 75 combines with blow-by gases from crankcase 144 at junction 98. The combined mix of the portion of air and crankcase vapors then flows through channel 76 to exit into intake manifold 44 via opening 29.

Channel 76 includes common shut-off valve 24 (or CSOV 24) fluidically coupled within channel 76. CSOV 24 may be actively controlled by controller 12 to allow/disallow flow of combined mix of air flow from aspirator 22 and blow-by vapors from crankcase 144. Thus, by adjusting an opening of CSOV 24, a motive flow through aspirator 22 can be varied, and an amount of vacuum drawn at aspirator throat can be modulated to meet engine vacuum requirements. Further still, by adjusting the opening of CSOV 24, crankcase ventilation (CV) flow including blow-by gases, through CV valve 26 into intake manifold 44 may be modulated. The CV valve 26 may be a passive valve that is not controlled by controller 12. Additionally, the opening of the CSOV may be varied based on engine conditions, particularly, engine idle conditions, to reduce or increase engine air ingestion from each of the aspirator 22 and the CV valve 26.

CSOV 24 may be an electrically actuated valve, and its state may be controlled by controller 12 based on engine idling conditions. Further, CSOV 24 may be either a binary valve (e.g. two-way valve) or a continuously variable valve. Binary valves may be controlled either fully open or fully closed (shut), such that a fully open position of a binary valve is a position in which the valve exerts no flow restriction, and a fully closed position of a binary valve is a position in which the valve restricts all flow such that no flow may pass through the valve. In contrast, continuously variable valves may be partially opened to varying degrees. Embodiments with a continuously variable CSOV may provide greater flexibility in control of the motive flow through the aspirator, with the drawback that continuously variable valves may be more costly than binary valves. In still other examples, CSOV 24 may be a gate valve, pivoting plate valve, poppet valve, or another suitable type of valve. Controller 12 may be operatively coupled to CSOV 24 to actuate CSOV 24 between an open or closed position (or to assume any position there-between for a continuously variable valve). For example, the controller may actuate the CSOV based on engine idling conditions. As an example, the CSOV may be adjusted to a fully open position (from a fully closed position) when the engine 10 is not idling. The engine may not be idling when the engine is spinning and the accelerator pedal 130 is depressed (e.g. not fully released). In another example, the controller may modulate the CSOV to the fully closed position (from the fully open position) in response to the engine being idle. The engine may be determined to be idling when engine speed is at idle speed while the accelerator pedal is fully released. Alternatively, the engine may be considered to be at idle when the engine speed is at idle speed (e.g. engine is spinning), and vehicle speed is zero (e.g., vehicle is at rest).

In yet another example, the CSOV may be controlled based on a desired engine air ingestion. To elaborate, the CSOV may be closed when an air flow rate into the intake manifold is greater than desired which may result in extra fuel being injected such as during idle conditions. For example, when a vehicle including an automatic transmission is idling and the vehicle is at rest (e.g., brake pedal is depressed while accelerator pedal is released), fuel flow rate into the engine may differ based on whether the engine is idling with the transmission in neutral or in gear. As such, when the vehicle is at rest during idle and the transmission is in gear (e.g., transmission not at neutral), the engine may consume a higher amount of fuel relative to that during idling with the transmission in neutral. Accordingly, the engine may ingest a lower amount of air when idling with the transmission in neutral than when idling with the transmission in gear.

As such, the CSOV may be closed when a desired throttle position is less than a minimum allowed throttle position. In other words, if a desired air flow (or engine air ingestion) is lower than an air flow rate achievable by a fully closed intake throttle, the CSOV may be adjusted to a fully closed position. Herein, the manifold vacuum may be deeper and the brake booster may receive vacuum from the intake manifold. Thus, aspirator generated vacuum may not be desired. Further, the desire for a lower intake air flow (or engine air ingestion) may be more important than ventilation of the crankcase. When the engine is warmed-up, crankcase ventilation may be deactivated during idle for short durations. By reducing crankcase ventilation flow and aspirator motive flow into the intake manifold, the engine can operate closer to maximum brake torque (MBT). Further, fuel economy during idle may be improved.

Exhaust gas sensor 126 is shown coupled to exhaust manifold 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 19 downstream of exhaust gas sensor 126 and exhaust turbine 92. Device 70 may be a three way catalyst (TWC), NOx trap, various other emission control devices, or combinations thereof.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle plate 64, CSOV 24, wastegate 69, fuel injector 66, and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator pedal position adjusted by vehicle operator 132; a position of brake pedal 168; a measurement of engine manifold pressure (MAP) from pressure sensor 121 coupled to intake manifold 44; a measurement of boost pressure from pressure sensor 122 coupled to boost chamber 46; a profile ignition pickup signal (PIP) from Hall effect sensor 118 (or other type) coupled to crankshaft 40; a measurement of air mass entering the engine from mass airflow sensor 120; a measurement of vacuum level in brake booster 160 via sensor 125; and a measurement of throttle position from sensor 58. Barometric pressure may also be sensed (sensor not shown) for processing by controller 12. In a preferred aspect of the present description, crankshaft sensor 118, which may be used as an engine speed sensor, may produce a predetermined number of equally spaced pulses for every revolution of the crankshaft from which engine speed (RPM) can be determined. Such pulses may be relayed to controller 12 as a profile ignition pickup signal (PIP) as mentioned above.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

It will also be appreciated that though the engine embodiment shown in FIG. 1 is a boosted engine, supplementary air flow from passive devices may be similarly controlled in a naturally aspirated engine via a CSOV coupled to each of an aspirator and a CV valve. Herein, the aspirator may be coupled across the intake throttle in an intake bypass passage wherein a portion of air is diverted from upstream of the intake throttle, through the aspirator and into the intake manifold. Further, when the CSOV is open, motive air flow rate through the aspirator may depend on the size of the aspirator as well as intake manifold pressure. For example, a lower pressure in the intake manifold relative to barometric pressure may enable a higher motive flow rate through the aspirator when the CSOV is opened (or when the opening of the CSOV is increased).

Turning now to FIG. 2, it depicts a schematic layout of engine 10 of FIG. 1. As such, components previously introduced in FIG. 1 are numbered similarly in FIG. 2 and not reintroduced.

Engine 10 is a multi-cylinder engine, as shown in FIG. 2. Specifically, engine 10 is depicted, in this example, with an inline-4 configuration wherein each of the four cylinders (cylinder 30) receives fuel via corresponding fuel injector 66. Though fuel injector 66 is shown coupled to only one cylinder, each of the four cylinders may receive fuel via an associated fuel injector. Intake air enters intake passage 42 and flows through air cleaner 41 into compressor 94. An intercooler 143 may be disposed downstream of compressor 94 to cool the compressed air exiting the compressor. Intake throttle 62 is fluidly coupled to intake manifold 44. As described earlier in reference to FIG. 1, throttle plate 64 of intake throttle 62 may be modulated by controller 12 to vary a quantity of intake air provided to intake manifold 44 and the plurality of cylinders therein.

A barometric pressure sensor (not shown) may be coupled at an inlet of intake passage 42 for providing a signal regarding barometric pressure (BP). Mass air flow (MAF) sensor 120 is shown coupled towards the inlet of intake passage 42 to communicate an air flow rate to controller 12 (included in control system 15). Compressor inlet pressure (CIP) may be measured by pressure sensor 129 fluidically coupled to intake passage 42 upstream of compressor 94 at an inlet of compressor 94. Boost pressure (also termed, throttle inlet pressure, TIP) may be determined by pressure sensor 122 fluidically coupled to boost chamber 46 upstream of intake throttle 62 and downstream of each of compressor 94 and intercooler 143. Pressure sensor 121 may be coupled to intake manifold 44 for providing a signal regarding manifold absolute pressure (MAP) to controller 12.

Intake manifold 44 is configured to supply intake air or an air-fuel mixture to the plurality of combustion chambers 30 of engine 10. The combustion chambers 30 may be arranged above a lubricant-filled crankcase 144 in which reciprocating pistons of the combustion chambers rotate a crankshaft (not shown). Crankcase 144 includes lubricating oil 78 and a dipstick 146 for measuring a level of oil 78 within crankcase 144. Crankcase 144 fluidically communicates with intake manifold 44, as described earlier, via conduit 84 (also termed, crankcase ventilation tube 84), CV valve 26, channel 76, and CSOV 24. Crankcase 144 is also fluidically coupled to intake passage 42 via conduit 86 (also termed, stale air path 86).

During boosted conditions, when intake manifold pressure is higher than compressor inlet pressure, crankcase vapors including blow-by gases may flow via conduit 86 towards node 90 along intake passage 42. Specifically, crankcase vapors may exit crankcase 144 through oil separator 202, and stream through conduit 86 to merge with fresh air in intake passage 42 at junction 90. As will be noted, junction 90 is positioned downstream of air cleaner 41. Thus, crankcase vapors flowing via stale air path 86 may merge with fresh intake air downstream of air cleaner 41 and upstream of compressor 94 at junction 90. CV flow via conduit 86 may be termed stale air CV flow since crankcase vapors are drawn into the intake passage 42 without the presence of fresh air. Conversely, when CV flow occurs via crankcase ventilation tube 84, fresh air from intake passage 42 enters crankcase 144 via conduit 86, such that CV flow through CV valve 26 includes a mix of fresh air and crankcase vapors.

CV valve 26 is schematically illustrated as a passive valve switching between a low flow orifice 158 and a higher flow orifice 156. Valve 154 positioned upstream of higher flow orifice 156 in secondary passage 148 is merely schematic in nature. Secondary passage 148 is depicted as being parallel to conduit 84 such that higher flow orifice 156 is parallel to low flow orifice 158. As such, this parallel positioning represents simultaneous flow of crankcase vapors through each of the low flow orifice 158 and the higher flow orifice 156 when valve 154 is open. It will be noted that valve 154 (and CV valve 26) is not controlled by controller 12. Instead, valve 154 may be controlled by vacuum level in the intake manifold 44. CV valve 26 further includes check valve 152. Check valve 152 is arranged in conduit 84 to allow the flow of crankcase vapors including blow-by gases only from crankcase 144 to intake manifold 44. Check valve 152 blocks air flow from intake manifold 44 and aspirator 22 to crankcase 144. Check valve 152 may also be schematic in nature since CV valve 26 may function as a check valve and block flow of compressed air from intake manifold 44 towards crankcase 144 during boost conditions. An example CV valve restricts flow with a smaller orifice (e.g. low flow orifice) when a deep intake manifold vacuum exists, and is less restrictive to flow (e.g. higher flow orifice) when a shallow intake manifold vacuum exists. A first example of CV valve configuration may include a substantially conic member (also termed, cone) arranged within a valve housing, where the cone is oriented within the valve housing such that its tapered end faces an end of the valve housing which communicates with the intake manifold. When there is no vacuum in the intake manifold, for example during engine off conditions, a spring keeps the base of the cone seated against the end of the valve housing which communicates with the crankcase, such that the CV valve is fully closed.

When there is a high level of vacuum (e.g., vacuum deeper than 50 kPa) in the intake manifold, for example under engine idle or deceleration conditions, the cone moves within the valve housing towards the intake manifold end of the valve housing due to the significant increase in intake manifold vacuum. At this time, the CV valve is substantially closed, and crankcase vapors move through a small annular opening (e.g., low flow orifice 158) between the cone and the valve housing. To elaborate, in reference to the schematic representation of CV valve 26 in FIG. 2, valve 154 may be closed during engine idle but a nominal flow of crankcase vapors may occur through low flow orifice 158. Herein, crankcase vapors may not flow through the higher flow orifice 156. Since minimal blow-by gases are produced during engine idle or deceleration conditions, the smaller annular opening, depicted as low flow orifice 158 in FIG. 2, may be adequate for crankcase ventilation. The low flow orifice may be sized to maintain a lower air flow rate into the engine at idling conditions.

When intake manifold vacuum is lower or at a shallower level (e.g., 15 to 50 kPa) such as during part-throttle operation, the cone moves closer to the crankcase end of the valve housing, and CV flow moves through a larger annular opening between the cone and the valve housing. At this time, the CV valve is partially open. Schematically, this may be represented by a progressive opening of valve 154 and an increase in CV flow via the higher flow orifice. During part-throttle operation, there may be an increased amount of blow-by gases in the crankcase relative to engine idle or deceleration conditions, and thus the larger annular opening may be appropriate for crankcase ventilation.

Finally, a further decrease in intake manifold vacuum (e.g., 0 to 15 kPa), such as during higher engine load conditions, moves the cone considerably closer to the crankcase end of the valve housing, and CV flow moves through an even larger annular opening between the cone and the valve housing. Schematically, this may be represented as valve 154 being fully open enabling a higher flow of crankcase vapors through the higher flow orifice 156. At this time, the CV valve (e.g. CV valve 26) is considered to be fully open, such that CV flow through the valve is maximized. The fully open state of the CV valve is well-suited to higher engine load conditions, since during these conditions there may be an increased amount of blow-by gases produced.

In some embodiments, a third orifice (not shown), distinct from low flow orifice 158 and higher flow orifice 156, may extend through the length of the cone allowing a fixed amount of CV flow to be metered through the CV valve even when the CV valve is fully closed. The third orifice may be enabled as a purposeful or deliberate leak in CV valve 26 such that during boosted engine conditions when the pressure in the intake manifold is higher than barometric pressure (and/or CIP), the lengthwise third orifice extending through the length of the cone may meter a smaller quantity of fresh boosted air from the intake manifold towards the crankcase enabling stale air path 86 to function as a fresh air path. To elaborate, blow-by gases exiting crankcase 144 towards intake passage 42 via conduit 86 during boosted conditions may now be combined with a smaller quantity of fresh boosted air received from intake manifold 44 via the lengthwise third orifice extending through the length of the cone of the CV valve 26. Further, when the lengthwise third orifice extending through the conic member is included, minimum CV valve flow rate may be based on the dimensions of the lengthwise third orifice within the conic member, as CV flow is metered through this lengthwise third orifice within the cone when the CV valve is in the fully closed position e.g. functioning as a check valve.

In this way, the opening state of the CV valve is influenced by manifold vacuum, and the flow rate of the CV valve is proportionate to manifold vacuum. As the pressure drop across the CV valve decreases, the area of the orifice in the CV valve increases to allow increased CV flow. The minimum flow rate of the CV valve is determined by the dimensions of the low flow orifice. During conditions where intake manifold pressure exceeds crankcase pressure (and/or barometric pressure), the CV valve is configured to prevent backflow via check valve 152.

A second example of CV valve configuration, as enabled by the CSOV in the present disclosure, may include a larger orifice relative to the size of low flow orifice 158. The low flow orifice 158, as mentioned above in reference to the first example configuration of the CV valve, may be sized to provide a smaller air flow rate into the engine at idle conditions. Since the CSOV 24 may be actuated to close (e.g., fully close) by controller 12 in response to engine idle conditions, CV flow via the low flow orifice 158 may be ceased as CSOV 24 is fully closed. Accordingly, the second example of CV valve configuration may include a larger low flow orifice, than that in the first example, to enable a higher CV flow when the CSOV is open (e.g., fully open) and a deeper manifold vacuum exists in intake manifold 44 during non-idle conditions. In other words, the low flow orifice may be enlarged to allow a higher crankcase ventilation flow during deeper vacuum levels in the intake manifold. Further, during engine idle conditions, the CSOV may be adjusted to the fully closed position to reduce crankcase ventilation flow from the enlarged low flow orifice.

The second example of CV valve configuration may be suitable for engine embodiments desiring a higher crankcase ventilation rate. For example, an engine system with direct fuel injection may experience higher fuel build up in the crankcase during cold starts, shorter drive cycles, etc. Thus, the crankcase may need to be frequently evacuated of blow-by gases resulting from excessive fuel vapors in the crankcase. In this case, using the second example CV valve configuration may enable rapid removal of crankcase vapors even when the engine has a deeper level of manifold vacuum (e.g., deeper than 50 kPa).

Aspirator 22 includes an inlet 65 and an outlet 68. As shown, first passage 72 of bypass passage 75 fluidically couples inlet 65 of aspirator 22 to intake passage 42 at first end 27 while second passage 74 of bypass passage 75 fluidically couples outlet 68 of aspirator 22 to channel 76 at junction 98. First end 27 of bypass passage 75 is coupled to intake passage 42 upstream of compressor 94. Meanwhile, bypass passage 75 is fluidically coupled to intake manifold 44 via channel 76 at opening 29.

Vacuum generated by aspirator 22 is supplied to brake booster 160 via conduit 87, as described earlier in reference to FIG. 1. As such, check valve 123 coupled in conduit 87 may enable air flow from brake booster vacuum reservoir 162 to aspirator 22, and may block flow of air from aspirator 22 towards brake booster vacuum reservoir 162. In addition to aspirator vacuum, brake booster 160 may also receive vacuum from intake manifold 44 along conduit 287. Specifically, air may flow out of brake booster vacuum reservoir 162 along conduit 87, past node 268 into conduit 287. Further, air drawn from brake booster vacuum reservoir 162 may flow through check valve 223 coupled to conduit 287 and may enter intake manifold 44 at opening 252. Check valve 223 coupled in conduit 287 may enable air flow from brake booster vacuum reservoir 162 to intake manifold 44, and may impede flow of air from intake manifold 44 towards brake booster vacuum reservoir 162. Vacuum from intake manifold 44 may flow in the opposite direction of air flow. Herein, intake manifold vacuum may be supplied via conduit 287 and conduit 87 to brake booster vacuum reservoir 162. To elaborate, conduit 287 fluidically couples brake booster vacuum reservoir 162 (via conduit 87 and via node 268) and intake manifold 44 (via opening 252). Brake booster vacuum reservoir 162 may receive vacuum from intake manifold 44 when the intake manifold vacuum is deeper (e.g., higher) than aspirator vacuum.

Thus, when the CSOV 24 is maintained open (e.g., fully open) during non-idling conditions and intake manifold pressure is lower than compressor inlet pressure (CIP), motive air may flow through aspirator 22 from inlet 65 towards outlet 68. The motive air flow enables vacuum generation at aspirator 22 that may be transferred to brake booster 160 via conduit 87.

Control system 15 is shown receiving information from a plurality of sensors 16 (various examples of which are described herein) and sending control signals to a plurality of actuators 81. As one example, sensors 16 may include TIP sensor 122, MAP sensor 121, and CIP sensor 129. As another example, actuators 81 may include fuel injector 66, CSOV 24, and intake throttle 62. Other actuators, such as a variety of additional valves and throttles, may be coupled to various locations in engine system 10. As mentioned earlier, CV valve 26 is not operatively coupled to control system 15 (or controller 12) and may not be actuated (in any manner) by controller 12. CV valve 26 primarily responds to a pressure in intake manifold 44, and a pressure drop across the CV valve. Controller 12 may receive input data from the various sensors, process the input data, and trigger the actuators in response to the processed input data based on instruction or code programmed therein corresponding to one or more routines. Example control routines are described herein with regard to FIGS. 6 and 8.

It will be noted that crankcase ventilation (CV) flow may include flow of crankcase vapors (e.g., blow-by gases) via either the stale air path 86 or the crankcase ventilation tube 84.

Figure 3:
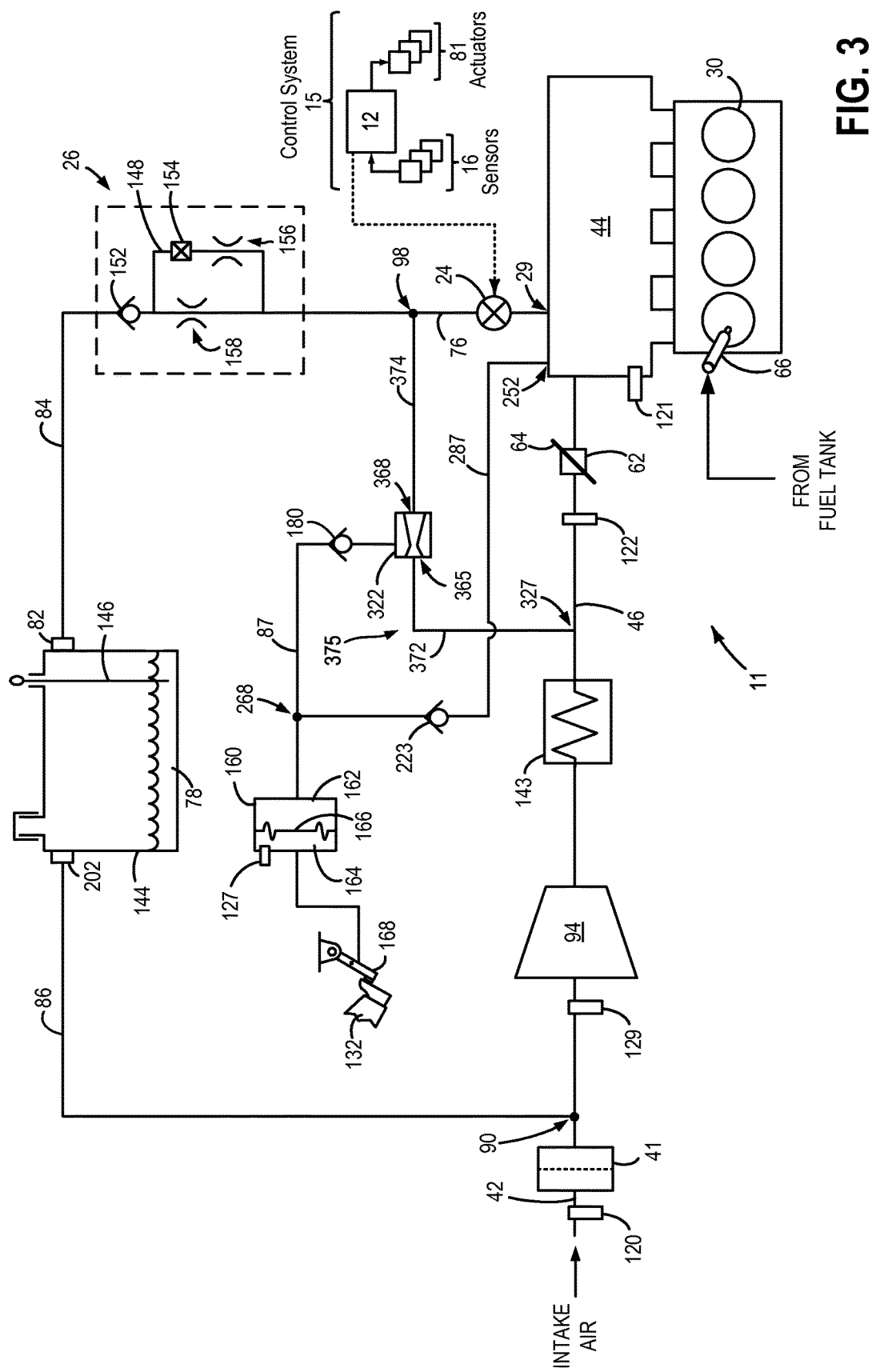
FIG. 3 shows an alternative embodiment of the boosted engine system of FIG. 1.

FIG. 3 shows a schematic layout of engine 11 which like engine 10 is a multi-cylinder engine. Many features and components of engine 11 are similar to engine 10 of FIG. 2, and therefore, the following description of FIG. 3 will primarily describe components exclusive to engine 11. As such, components previously introduced in FIG. 2 are numbered similarly in FIG. 3 and not reintroduced.

Engine 11 includes aspirator 322 coupled in bypass passage 375. Bypass passage 375 includes a first section 372 fluidically coupling an inlet 365 of aspirator 322 to intake passage 42 downstream of compressor 94. To elaborate, first end 327 of bypass passage 375 is fluidically coupled to boost chamber 46 downstream of each of compressor 94 and intercooler 143 and upstream of intake throttle 62. In some embodiments, first end 327 of bypass passage 375 may be fluidically coupled to boost chamber 46 downstream of compressor 94 but upstream of intercooler 143. The outlet 368 of aspirator 322 is fluidically coupled to channel 76 via second section 374 of bypass passage 375. Specifically, bypass passage 375 enables fluidic communication between aspirator 322 and intake manifold 44 via channel 76 and CSOV 24.

In the depicted example of FIG. 3, a portion of air is diverted into aspirator 322 from upstream of intake throttle 62 and downstream of compressor 94. Thus, aspirator 322 receives compressed air as motive air flow. The portion of compressed air flowing through aspirator 322 is directed to intake manifold 44 via channel 76 through CSOV 24 when the CSOV 24 is held open. Similar to aspirator 22 of FIGS. 1 and 2, aspirator 322 generates vacuum due to motive flow of compressed air. This vacuum may be supplied to one or more vacuum consumption devices. In the example shown in FIG. 3, vacuum from aspirator 322 is delivered to brake booster 160 via conduit 87.

Since aspirator 322 is fluidically coupled to boost chamber 46, motive air flow through the aspirator may continually be in a forward direction: from boost chamber 46 to intake manifold 44. Reverse motive flow, such as motive flow from intake manifold 44 to inlet of intake throttle 62, may not occur through aspirator 322. As such, manifold pressure (MAP) may not exceed throttle inlet pressure (TIP) or boost pressure, even during boosted conditions. Further, MAP may be equal to boost pressure or may be lower than boost pressure, but may not be higher than boost pressure. Accordingly, motive flow through aspirator 322 may occur only from inlet 365 to outlet 368, and motive flow through aspirator 322 may not occur from outlet 368 to inlet 365. Since TIP may be higher than both MAP and BP when compressor 94 is operating, performance of aspirator 322 may be more enhanced relative to aspirator 22 of FIG. 2. As such, a higher pressure differential may exist across aspirator 322 in comparison to that across aspirator 22 of FIG. 2.

Conversely, motive flow through aspirator 22 in FIGS. 1 and 2 may occur in both the forward direction and in the reverse direction. Motive flow in the forward direction may include air flow from upstream of compressor 94, through inlet 65 of aspirator 22 and out of outlet 68 of aspirator 22, towards intake manifold 44 via channel 76 and CSOV 24. Motive air flow through aspirator 22 in the reverse direction may comprise air flow from intake manifold 44, through CSOV 24, via channel 76 and junction 98, into second passage 74 of bypass passage 75, and thereon into outlet 68 of aspirator 22 towards inlet 65 of aspirator 22, and further on into intake passage 42 upstream of compressor 94 via first end 27 of bypass passage 75. Motive flow in the forward direction may occur when manifold pressure is lower than compressor inlet pressure. Motive flow in the reverse direction may occur when manifold pressure is higher than compressor inlet pressure, such as during boosted conditions. Compressor inlet pressure (CIP) may be substantially equivalent to barometric pressure at the inlet of intake passage 42.

Figure 4:
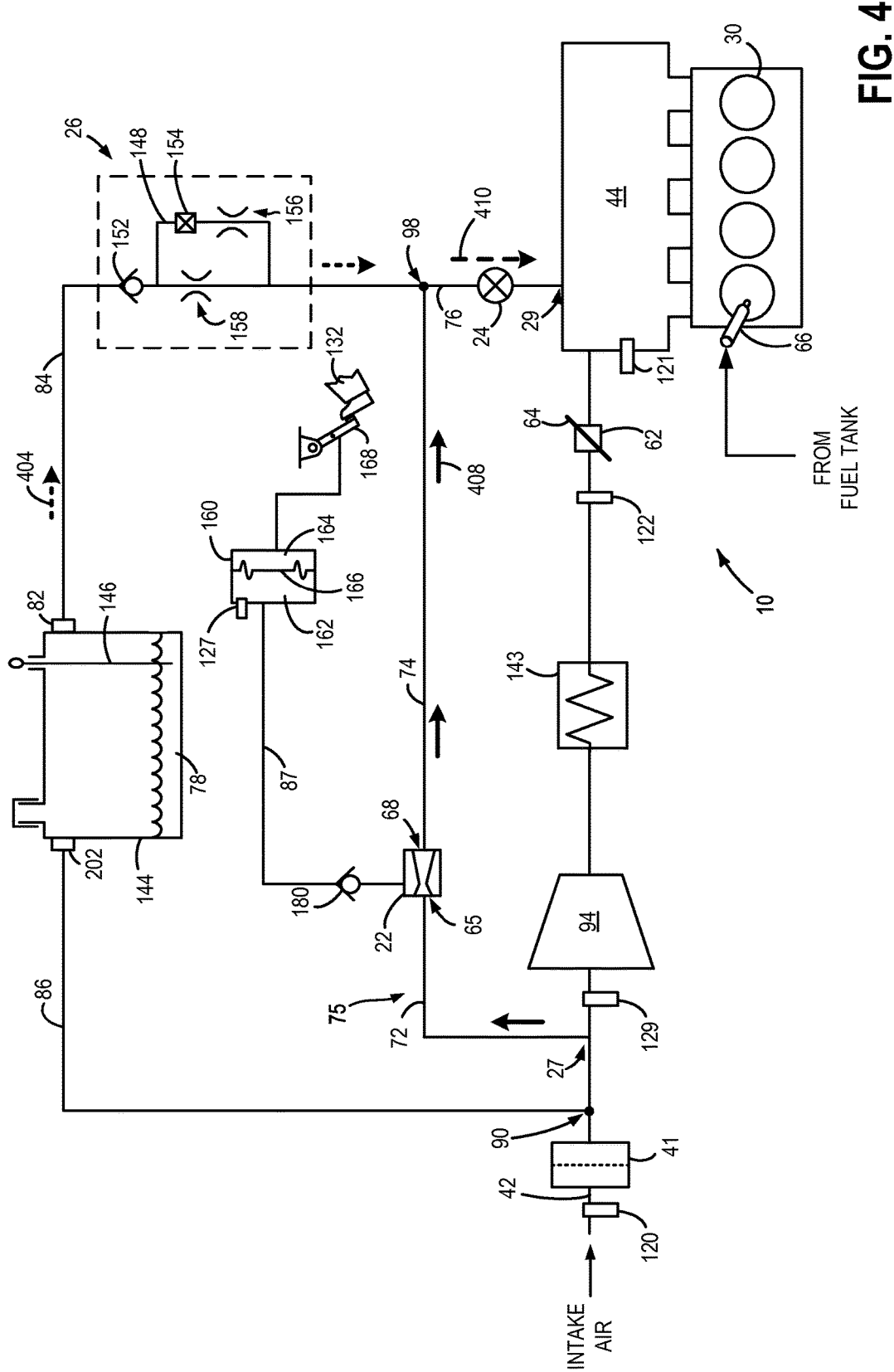
FIG. 4 presents a schematic depiction of air flow through the CSOV when the boosted engine is not idling and when manifold pressure is lower than barometric pressure.
Figure 5:
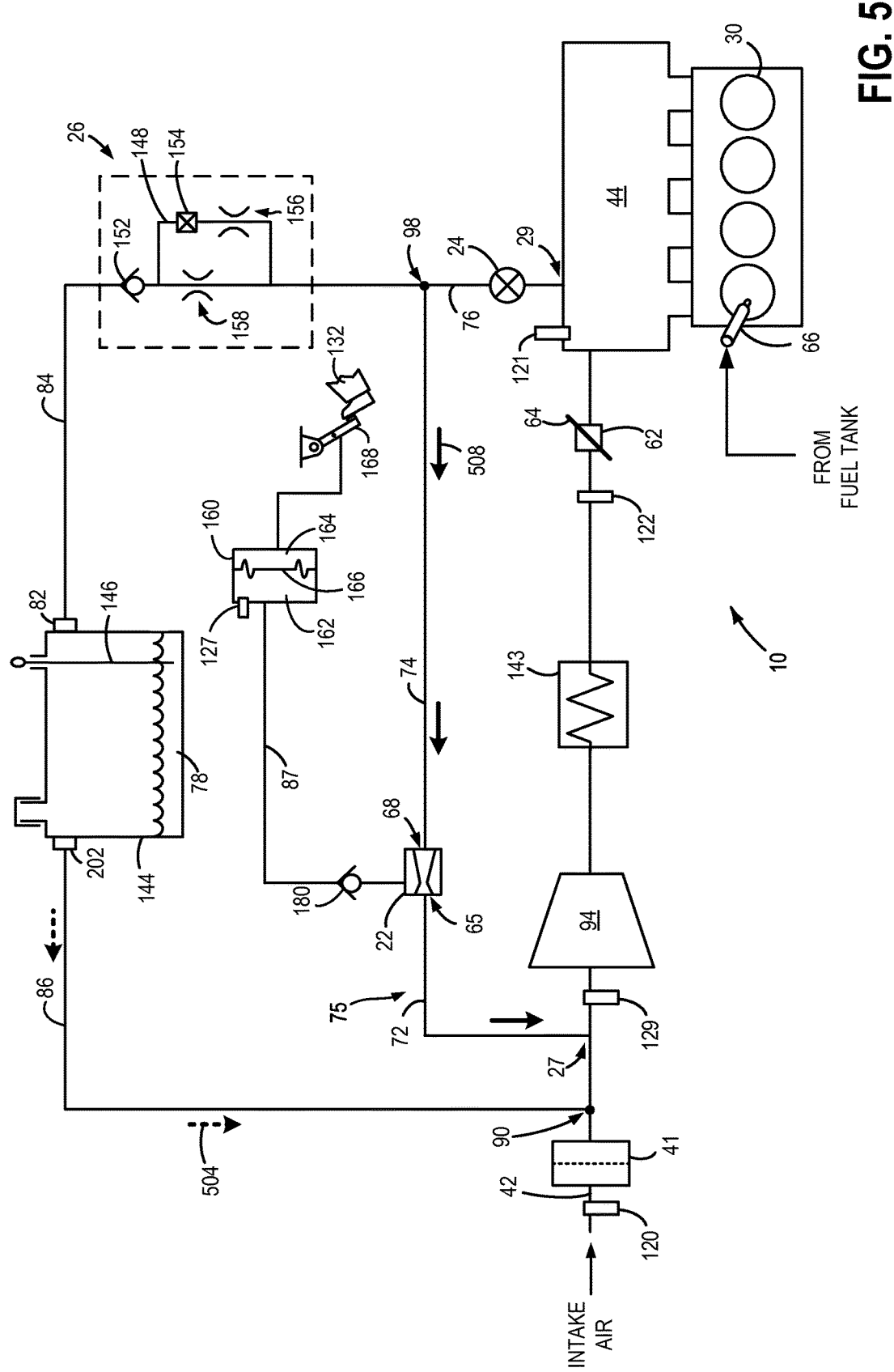
FIG. 5 displays a schematic illustration of air flow through the CSOV when the boosted engine is not idling and when manifold pressure is higher than barometric pressure.

Turning now to FIG. 4, a schematic depiction of engine air ingestion during non-idling conditions in engine 10 is shown. Herein, pressure in the intake manifold 44 may be lower than barometric pressure (e.g., during non-boosted conditions). Specifically, intake manifold pressure may be lower than CIP. Air flow through aspirator 22 is depicted by dark solid lines (408) while CV flow of blow-by gases is indicated by small dashed lines (404). The direction of air flow is depicted by arrows. The combined flow of crankcase vapors and motive flow from the aspirator 22 is indicated by a line comprising larger dashes between junction 98 and intake manifold 44. It will be noted that conduit 287 coupling brake booster vacuum reservoir 162 and intake manifold 44 is not included in FIGS. 4 and 5 for enabling clarity of motive air flow through aspirator 22 and crankcase ventilation flow. In other words, the embodiments of FIGS. 4 and 5 are the same as the embodiment of FIG. 2 and may include conduit 287 supplying vacuum to brake booster vacuum reservoir 162, though not specifically depicted.

During engine operation when engine speed is not at idle speed (e.g., higher than idle speed), the CSOV 24 may be actuated open (e.g. from closed position at engine idle) electronically by controller 12. As such, the CSOV 24 may be at a fully open position in the example of a binary valve. If CSOV 24 is a continuously variable valve, CSOV 24 may be adjusted to a position between fully open and fully closed, if desired. For example, CSOV 24 may be actuated to a mostly open position enabling a higher air flow through the CSOV relative to that when closed.

When pressure in the intake manifold 44 (MAP) is lower than CIP, air flow through aspirator 22 may occur in the forward direction: from inlet 65 to outlet 68 of aspirator 22. Thus, aspirator motive flow 408 (as shown by the dark solid lines) may stream from intake passage 42 into first end 27 of bypass passage 75, through inlet 65 of aspirator 22, across outlet 68 of aspirator 22, via second passage 74 of bypass passage 75 into channel 76. As such, motive air may be drawn from upstream of compressor 94 into inlet 65 of aspirator 22. Further, motive air from aspirator 22 may enter channel 76 at junction 98, and may combine with CV flow 404 (as shown by small dashes) from crankcase 144.

CV flow 404 is shown exiting crankcase 144 via oil separator 82 into crankcase ventilation tube 84. Since CIP is higher than MAP, or barometric pressure is higher than MAP, fresh air from upstream of compressor 94 may also be drawn into crankcase 144 via conduit 86. This fresh air may be drawn along with crankcase vapors out of crankcase 144 as CV flow 404. Crankcase vapors and fresh air received via conduit 86 may exit crankcase 144 via oil separator 82 into crankcase ventilation tube 84 and flow through CV valve 26. Based on the level of manifold vacuum, the CV flow may stream through a larger orifice or a relatively smaller orifice. Specifically, a larger CV flow may occur at manifold vacuum levels of 0-15 kPa, when CV valve 26 is fully open and a relatively smaller CV flow may stream through CV valve 26 at deeper vacuum levels in the intake manifold. The CV flow 404 may exit CV valve 26 and merge with aspirator motive flow 408 from second passage 74 of bypass passage 75 at junction 98.

The combined mix of aspirator motive flow 408 and CV flow 404 may be represented by mixed air 410 (long dashes). Thus, mixed air 410 may flow from junction 98 to opening 29, via CSOV 24 into intake manifold 44. It will be appreciated that during non-boosted conditions when the CSOV is held fully open, the combined mix of aspirator motive flow and CV flow from the CV valve may stream together through the CSOV. Further, no other flow other than the motive flow and crankcase ventilation flow from CV valve 26 may flow through the CSOV.

In this way, engine 10 may ingest air flow received via intake throttle 62 as well as mixed air 410 including the portion of air diverted into aspirator 22 (as motive flow 408), as well as CV flow 404 from crankcase 144. To elaborate, CV flow 404 and motive flow 408 may be received together, as a combined mix, into intake manifold 44 via channel 76 and through CSOV 24. Intake manifold 44 may simultaneously receive air flow via intake throttle 62.

FIG. 5 depicts an example engine air ingestion in engine 10 when the pressure in the intake manifold is higher than barometric pressure (or CIP). Thus, air flow through aspirator 22 and crankcase 144 during boosted conditions is portrayed in FIG. 5. Motive flow through aspirator 22 is shown by dark, solid lines (508) while crankcase vapors are shown by dashed lines (504). The direction of air flow is indicated by arrows.

When the engine, such as engine 10, is boosted, pressure in the intake manifold 44 may be higher than barometric pressure. Specifically, intake manifold pressure may be substantially higher than CIP. Since the engine is not idling, the CSOV 24 may be maintained open by the controller 12. As such, the CSOV may be at a fully open position. Alternately, if CSOV is a continuously variable valve, the opening of the CSOV may be increased from that at fully closed. Further, the CSOV may be adjusted to a position between fully open and fully closed, if desired.

Since MAP is higher than CIP, motive flow through aspirator 22 occurs in the reverse direction. Motive air 508 flows from intake manifold 44, via opening 29, through CSOV 24, past junction 98, into second passage 74 of bypass passage 75. Further, motive air 508 enters outlet 68 of aspirator 22 and flows through to exit out of inlet 65 of aspirator 22. The motive air 508 is then drawn into the compressor inlet via first passage 72. Specifically, motive air 508 existing aspirator 22 at inlet 65 flows through bypass passage 75 and merges with fresh intake air in intake passage 42 via first end 27 of bypass passage 75. Motive air 508 merges with fresh air in intake passage 42 at a point that is upstream of compressor 94 and downstream of air cleaner 41. Further, the motive air 508 may combine with fresh air in intake passage 42 at a point downstream from junction 90 of stale air path 86.

Further still, during boosted conditions, CV valve 26 may be fully closed. As such, the base of the cone in the CV valve may be seated against the end of the valve housing which communicates with the crankcase, so that the CV valve is fully closed. This blockage of reverse air flow through CV valve 26 may be represented by check valve 152 impeding flow of air from intake manifold 44 towards crankcase 144.

In the alternative embodiment of the CV valve which includes the lengthwise third orifice extending through the length of the cone in the CV valve, a smaller amount of boosted air may be metered through this lengthwise third orifice towards the crankcase even when the CV valve is fully closed.

Since air flow from the intake manifold is obstructed by check valve 152, crankcase vapors may exit the crankcase via conduit 86. As such, when crankcase pressure is higher than barometric pressure, crankcase vapors 504 may stream from crankcase 144 through oil separator 202 into stale air path 86. These crankcase vapors 504 may not be mixed with fresh air. As shown in FIG. 5, crankcase vapors 504 may be drawn into intake passage 42 at junction 90 upstream of compressor 94, and upstream of first end 27 of bypass passage 75. Further, crankcase vapors 504 may merge with fresh air in intake passage 42 at junction 90 located downstream of air cleaner 41.

Thus, when MAP is higher than CIP, motive air 508 from aspirator 22 and crankcase vapors 504 may not be combined together before being delivered into intake manifold 44, as in the air flow shown in FIG. 4. In the example of FIG. 5, motive air 508 and crankcase vapors 504 may merge separately with fresh air in intake passage 42 before flowing into the inlet of compressor 94. Further, neither the motive air 508 from aspirator 22 nor the crankcase vapors 504 are received directly into intake manifold 44. Herein, each of the motive air flow and the crankcase vapors may be received in the intake manifold along with fresh air via the intake passage past the intake throttle. It will also be noted that during boosted conditions, only air flow towards the aspirator 22 may flow through the CSOV. During other engine conditions (e.g. non-idle and non-boosted), when the CSOV is opened, the flow through the CSOV may include motive flow from the aspirator and CV flow from the CV valve 26.

The controller 12 may include instructions for closing the CSOV 24 when it is determined that the engine is at idle. As such, the CSOV may be closed during substantially lower intake air flow rate conditions such as when transmission is in neutral, lowest engine speed, warmed-up conditions, absence of engine loads such as air conditioning, lower demands on an alternator etc.

The CSOV 24 may be adjusted to a fully closed position from a fully open position upon confirming engine idle conditions. As mentioned earlier, in one example, engine idle may be confirmed by determining that engine speed is at idle speed while an accelerator pedal is completely released. Since CSOV 24 regulates each of motive air flow via aspirator 22 and CV flow via CV valve 26, the controller 12 may regulate each of the aspirator motive flow as well as CV flow by adjusting the CSOV 24. By closing CSOV 24 during engine idle, engine air ingestion from sources such as the aspirator 22 and/or the crankcase via CV flow may be ceased simultaneously. Additionally, by terminating air ingestion from sources other than the intake throttle, substantially smaller quantities of fuel may be injected into the engine to maintain engine idle. Herein, air flow into the engine may be primarily controlled by intake throttle 62 and passive sources of supplementary air flow may be excluded by shutting the CSOV. Accordingly, fuel consumption during idle may be significantly reduced enabling an improvement in fuel economy and fuel efficiency.

Thus, an example system for an engine may comprise an engine intake manifold, a crankcase coupled fluidically to the engine intake manifold via a crankcase ventilation (CV) valve and a common shut-off valve, an intake throttle, a boost device including a compressor positioned in an intake passage upstream of the intake throttle, an aspirator positioned across each of the compressor and the intake throttle, the aspirator coupled to a vacuum consumption device, a motive inlet of the aspirator fluidically coupled to the intake passage upstream of the compressor, a motive outlet of the aspirator fluidically coupled to the engine intake manifold, downstream of the intake throttle, via the common shut-off valve, and a controller configured with computer readable instructions stored on non-transitory memory to adjust the CSOV to a fully closed position in response to engine idle, and discontinue each of motive flow through the aspirator and CV flow through the CV valve synchronously.

The controller may include further instructions to adjust the CSOV to a fully open position when the engine is not idling. Herein, each of the motive flow through the aspirator and the CV flow through the CV valve may be received together (as a combined mix) in the engine intake manifold when pressure in the engine intake manifold is lower than a pressure at the inlet of the compressor. The motive flow through the aspirator may include air flow from an inlet of the compressor to the engine intake manifold, and wherein CV flow through the CV valve may include blow-by gases from the crankcase. When pressure in the engine intake manifold is higher than the pressure at the inlet of the compressor, such as during boosted conditions, motive flow through the aspirator may include air flow from the engine intake manifold to the inlet of the compressor, termed reverse flow. Further, during boosted conditions such as when pressure in the engine intake manifold is higher than the pressure at the inlet of the compressor, CV flow through the CV valve is ceased. Specifically, crankcase vapors may exit the crankcase through the stale air path 86 but may not flow through the crankcase ventilation tube 84 via the CV valve 26 into intake manifold 44 during boosted conditions.

It will be appreciated that a higher flow aspirator may be used in the example embodiments described herein. These up-sized aspirators may enable a higher motive flow rate leading to increased vacuum generation for use in vacuum consumption devices such as brake boosters. By coupling the aspirator between the intake manifold and upstream of the compressor (or upstream of intake throttle and downstream of compressor as in FIG. 3), adequate opportunity is available for continuous motive air flow through the aspirator. Specifically, since the CSOV is adjusted to the fully open position during all engine conditions except engine idle, motive air flow through the aspirator may occur during boosted as well as non-boosted conditions.

Figure 6:
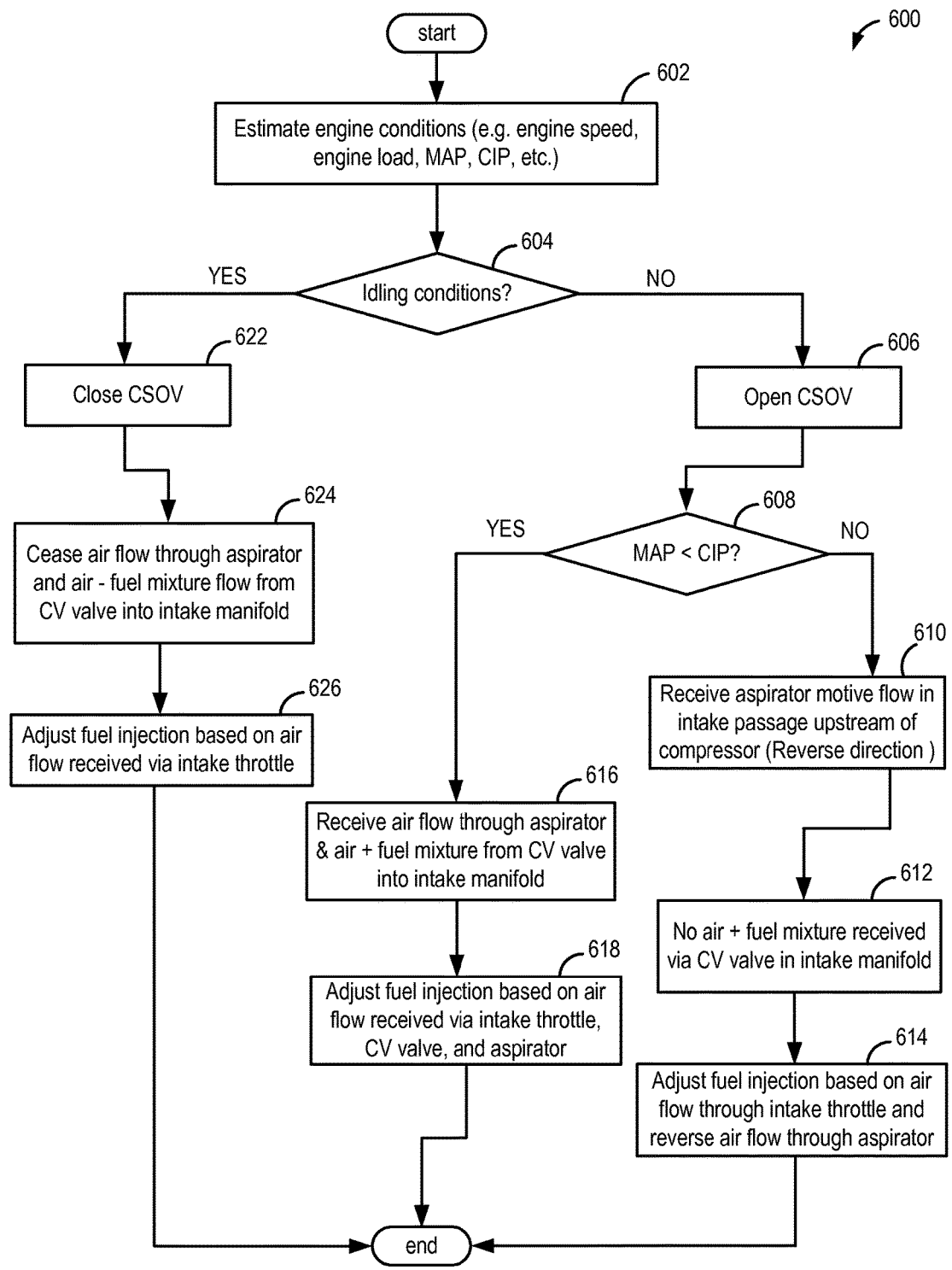
FIG. 6 depicts a high level flow chart for regulating air flow through the CSOV during various engine conditions, in accordance with the present disclosure.
Figure 7:
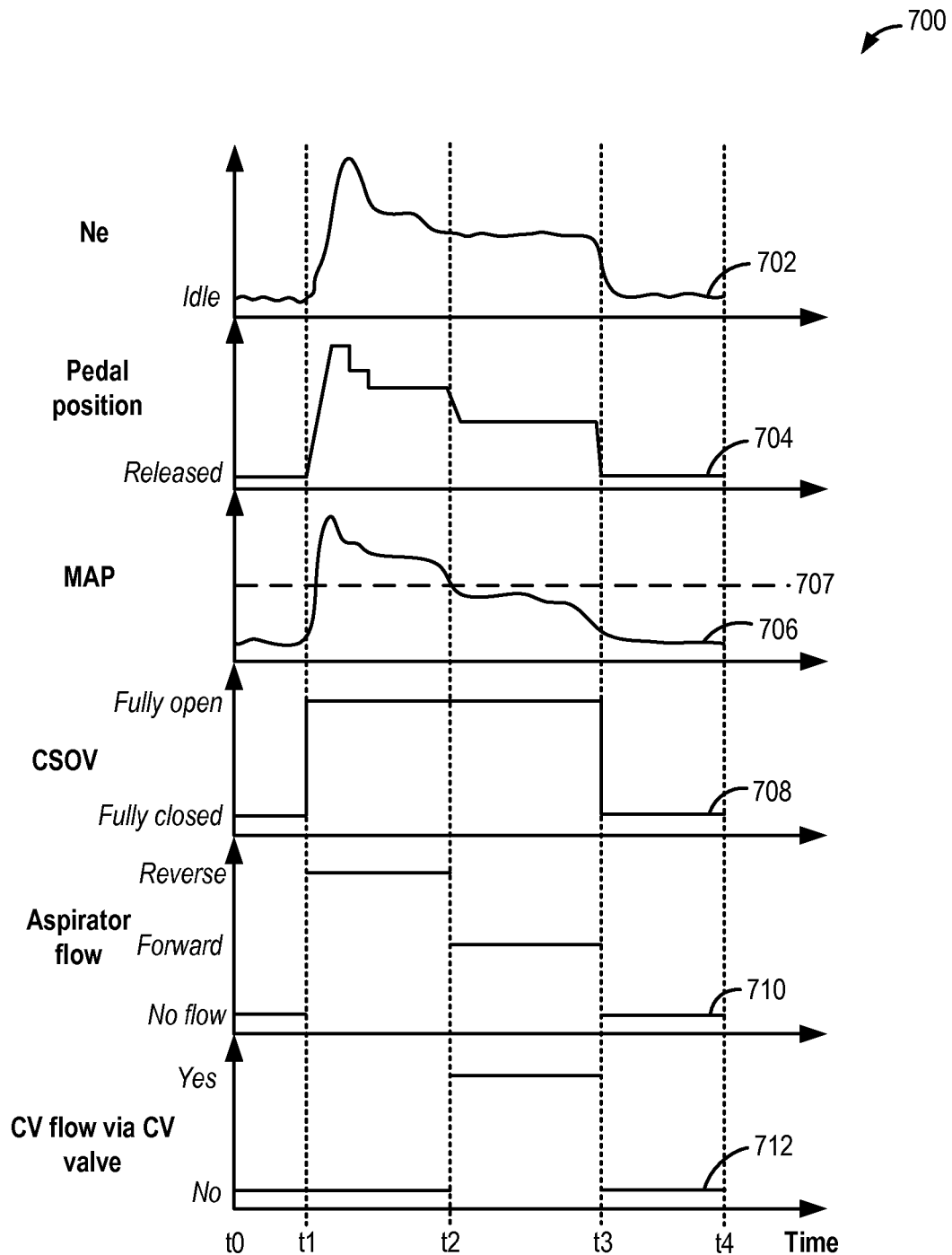
FIG. 7 shows an example operation of the CSOV based on engine conditions.

Turning now to FIG. 6, it presents an example routine 600 illustrating a control operation of the common shut-off valve (CSOV), e.g. CSOV 24 of FIGS. 1 and 2. Specifically, a controller in engine 10 may actuate the CSOV to open (e.g. increase an opening of the CSOV) when the engine is not idling. Further, the controller 12 may electronically actuate the CSOV 24 to close (e.g., decrease the opening of the CSOV) when the engine is idling.

At 602, routine 600 may estimate and/or measure engine conditions such as engine speed (Ne), engine load, manifold pressure, compressor inlet pressure, intake throttle position, and pedal position (e.g., accelerator pedal, brake pedal, etc.). At 604, routine 600 may confirm if the engine is idling. Idling conditions may be determined, in one example, when engine speed is substantially at idle speed. In another example, the engine may be idling when an operator foot is off the accelerator pedal (e.g., accelerator pedal is fully released), and the engine speed is at idle speed. In yet another example, it may be determined that the engine is idling when the accelerator pedal is released fully, the brake pedal is at least partially depressed, and the engine speed is at idle speed.

Other parameters may also be selected to determine that the engine is at idle. For example, throttle position may be used to confirm that the engine is idling. As such, throttle position may be controlled electronically based on a desired idle speed. The controller may vary throttle position based on a difference between a measured idle speed and the desired idle speed. In another example, spark timing may be used to determine that the engine is idling. For example, an engine at idle may have a retarded timing relative to maximum brake torque (MBT) timing.

As mentioned earlier, the CSOV may be closed when engine air ingestion demand is lower than that obtained with a fully closed intake throttle. To elaborate, the intake throttle may be fully closed but the engine may receive a higher air flow than desired. In this situation, the CSOV may be fully closed to terminate each of motive air flow from the aspirator and crankcase ventilation flow. If idling conditions are not confirmed, routine 600 proceeds to 606, to open the CSOV. Herein, an opening of the CSOV may be increased in response to the non-idling conditions. As an example, the CSOV may be adjusted to a fully open position from a fully closed position. If the CSOV is a continuously variable valve, the CSOV may be shifted from a mostly closed position to the fully open position in another example. By increasing the opening of the CSOV, aspirator motive flow may be enabled. Further, based on engine conditions, crankcase vapors may also flow through the CV valve into the CSOV, and thereon into the intake manifold.

Next, at 608, routine 600 determines if pressure in the intake manifold (MAP) is lower than a pressure at an inlet of the compressor (CIP). As such, CIP may be substantially equal to barometric pressure, BP. During boosted conditions, MAP may not be lower than CIP while during non-boosted conditions, MAP may be lower than CIP. If it is determined that MAP is higher than CIP, routine 600 progresses to 610, wherein motive flow from the aspirator is received at the compressor inlet (e.g., motive flow 508 in FIG. 5). Herein, due to the boosted condition in the engine, reverse air flow may be occurring in the aspirator. As described earlier, in reference to FIG. 5, the reverse motive flow through the aspirator includes air flowing from the intake manifold through the CSOV into bypass passage 75, to enter outlet 68 of aspirator 22 as motive flow. This motive flow then exits the aspirator 22 via its inlet 65, and streams towards the compressor inlet to merge with fresh intake air in the intake passage 42 via the first end 27 of the bypass passage 75. In this condition (when MAP is higher than CIP), air flow towards the aspirator 22 (motive flow) may be the only flow streaming through the CSOV 24.

At 612, due to the boosted conditions, CV flow via the CV valve may not be received directly in the intake manifold. Instead, crankcase vapors (e.g., crankcase vapors 504 of FIG. 5) may flow from the crankcase towards the intake passage, to upstream of the compressor, via the stale air path (e.g., conduit 86). Further, at 614, routine 600 may adjust fuel injection based on the air ingested by the engine via the intake throttle and air diverted from the intake manifold towards aspirator 22 as well as crankcase vapors received into the intake passage via the stale air path. As an example, fuel injection timing may be adjusted. Alternatively, fuel injection amount may be modified. In addition to the variation in fuel injection, throttle position may be modulated based on a desired torque. Further still, spark timing may also be adjusted.

Returning to 608, if it is determined that MAP is lower than CIP, routine 600 continues to 616 wherein motive air from the aspirator and CV flow via the CV valve may be received in the intake manifold. As described earlier in reference to FIG. 4, the lower pressure in the intake manifold enables a forward motive flow through the aspirator (e.g., 408 of FIG. 4). To elaborate, a portion of air from upstream of the compressor 94 (from the compressor inlet) in the intake passage is rerouted via the aspirator 22. This portion of air enters the inlet 65 of aspirator 22 as motive air and exits the aspirator via outlet 68. Further, this motive air may continue towards channel 76 to merge with crankcase vapors received as CV flow via the CV valve. As such, due to the lower pressure in the intake manifold, the CV valve may enable CV flow via the crankcase ventilation tube 84. Crankcase vapors (e.g., 404 in FIG. 4) may flow from the crankcase along with fresh air through the CV valve 26 into channel 76. Herein, the crankcase vapors as well as fresh air received via conduit 86 may be termed CV flow. The CV flow may be combined with motive air flow from the aspirator at junction 98 upstream of CSOV 24. Thereafter, the combined mix of CV flow and aspirator motive air flow may stream together along channel 76 and into intake manifold 44 via CSOV 24. As such, no other flows may stream through the CSOV when the CSOV is opened and when the manifold pressure is lower than CIP.

Next, at 618, engine parameters may be adjusted in response to the mix of CV flow and aspirator motive air flow entering the intake manifold. For example, fuel injection timing and/or amount may be adjusted in response to the blow-by gases in the CV flow and the additional air from the aspirator. In another example, throttle position may be adjusted to compensate for the supplementary air received from the aspirator and the crankcase.

Returning to 604, if it is confirmed that the engine is idling, routine 600 proceeds to 622. Herein, the CSOV may be actuated by the controller to close. Specifically, the CSOV may be adjusted to the fully closed position. For example, the CSOV may be moved to the fully closed position from a fully open position (previously used during non-idle conditions). Further, at 624, CV flow as well as aspirator motive flow may be terminated concurrently by closing the CSOV. As such, the electronic controller may not modulate any other valves to cease each of the aspirator motive flow and the CV flow. Accordingly, the intake manifold may not receive supplementary air from either the aspirator or the crankcase. Further still, in response to the closing of the CSOV, various engine parameters may be adjusted. For example, fuel injection may be adjusted at 626 based on the air flow received via the intake throttle alone. As an example, fuel injection amount may be reduced. In another example, spark timing may be retarded from MBT when the engine is idling.

It will be appreciated that CSOV 24 may be opened, regardless of extra engine air ingestion, if brake booster vacuum is shallower than a threshold amount and vacuum replenishment is desired. As such, the CSOV may be opened at all engine conditions when supplementary air flow through CSOV 24 does not adversely affect engine operation. A serendipitous advantage to the location of CSOV 24 in conduit 84, as shown in FIGS. 2 and 3, is lubrication of sliding elements within CSOV 24 by remnant oil mist within crankcase ventilation flow. The remnant oil mist may not be removed by oil separator 82.

It will be noted that in alternative examples, CSOV 24 of FIG. 2 may be closed if MAP is greater than CIP. Herein, reverse motive flow through aspirator 22 may not be allowed.

An example method for a boosted engine may comprise, during a first condition, increasing an opening of a common shut-off valve (CSOV), flowing motive air through an aspirator from a compressor inlet to an intake manifold via the CSOV, and drawing blow-by gases from a crankcase through a crankcase ventilation (CV) valve and the CSOV into the intake manifold, and during a second condition, decreasing the opening of the CSOV, discontinuing motive air flow through the aspirator, and ceasing drawing of blow-by gases from the crankcase via the CV valve and the CSOV into the intake manifold. The first condition may include an intake manifold pressure lower than a compressor inlet pressure and a non-idling condition of the boosted engine. Further, the second condition may include an engine idle condition. The method may further comprise, during a third condition, increasing the opening of the CSOV, flowing motive air through the aspirator from the intake manifold to the compressor inlet, and not receiving blow-by gases from the crankcase through the CV valve and the CSOV into the intake manifold. The third condition may include the intake manifold pressure being higher than the compressor inlet pressure and the non-idling condition of the boosted engine. The method may further comprise generating a vacuum at the aspirator due to the motive flow during each of the first condition and the third condition and applying the vacuum to a vacuum consumption device, wherein the vacuum consumption device includes one or more of a brake booster, a fuel vapor canister, and a vacuum reservoir.

An example operation of the CSOV included in an engine, such as engine 10, is depicted in FIG. 7. Map 700 in FIG. 7 presents engine speed at plot 702, accelerator pedal position at plot 704, manifold pressure (MAP) at plot 706, a state of the CSOV at plot 708, aspirator flow at 710, and CV flow through the CV valve at plot 712. All the above are plotted against time on the x-axis. Further, time increases from the left of the x-axis to the right of the x-axis. Map 700 also includes line 707 representing barometric pressure (BP). As such, a compressor inlet pressure may be substantially equal to BP. Therefore, when MAP is lower than BP, MAP is also lower than CIP.

Between t0 and t1, engine speed is at idle speed and the accelerator pedal position is fully released. Thus, it may be determined that the engine is idle. In addition to the above, the engine may be determined to be at idle based upon a vehicle speed being substantially zero, and/or based on retarded spark timing at idle. At idle, manifold pressure is considerably lower than BP. With the engine at idle, the CSOV may be fully closed by the controller to reduce engine air ingestion from aspirator motive flow and/or CV flow via the CV valve. Since the CSOV is fully closed, there is no aspirator motive flow (plot 710) and no CV flow through the CV valve (plot 712).

At t1, a vehicle operator may depress the accelerator pedal to sharply increase vehicle speed (not shown). For example, the operator may be accelerating to merge into a highway and may fully depress the accelerator pedal. In response to accelerator pedal application, engine speed rises rapidly as a desired torque is produced. As such, the engine may now be boosted to provide the desired torque. Therefore, the MAP is significantly higher than BP (line 707) between t1 and t2. Since the engine is not idling, the CSOV may be actuated by the controller to a fully open position enabling a flow of motive air through the aspirator. However, since MAP is higher than BP, a reverse aspirator flow may occur, similar to that described in reference to FIG. 5. Air may flow from the intake manifold towards the compressor inlet through the aspirator, via the CSOV, and the bypass passage including the aspirator. Further, since the engine is boosted, the CV valve may be fully closed restricting air flow from the intake manifold towards the crankcase. Thus, between t1 and t2, there is no CV flow through the CV valve. However, as shown in FIG. 5, crankcase vapors may be received in the intake passage upstream of the compressor (e.g. at the compressor inlet) via the stale air path through conduit 86.

Between t1 and t2, the pedal position may be slightly released allowing the engine speed to stabilize by t2 towards a steady state speed. Since the engine is not idling, the CSOV continues to be at its fully open position. Further, at t2, MAP may reduce below BP. As an example, MAP be lower than BP when engine load is lower. As MAP falls below BP, CV flow via the CV valve may be received in the intake manifold (plot 712). Further, a forward direction flow may occur through the aspirator. Herein, due to the CIP being higher than the MAP, a portion of air may be diverted from the compressor inlet to the intake manifold via the aspirator. As such, the portion of air may flow in the forward direction from the inlet of the aspirator towards the outlet of the aspirator as motive flow. Further, this motive flow may unite with CV flow through the CV valve upstream of the CSOV, and the combined mixture of motive flow and CV flow may stream into the intake manifold at the same time via the fully open CSOV.

At t3, engine speed may drop in response to the accelerator pedal being fully released. Therefore, between t3 and t4, engine speed substantially returns to idle speed. Since the accelerator pedal is completely released, the controller may determine that the engine is at idle. In response to the determination of engine idling, the CSOV may be actuated to its fully closed position at t3 by the controller. Accordingly, CV flow via the CV valve and aspirator motive flow may be concurrently ceased at t3. Further, no other valves may be actuated by the controller to terminate each of the CV flow via the CV valve and the aspirator motive flow.

Since the engine is idling, MAP is significantly lower than BP as the intake throttle is closed responsive to engine idle conditions.

Accordingly, as the engine idles, the CSOV is closed terminating each of aspirator motive flow and CV flow via the CV valve between t3 and t4. Air flow into the engine may now be largely controlled by the intake throttle. Supplementary air flow from passive devices such as the aspirator and/or the CV valve may be terminated during idle.

Figure 8:
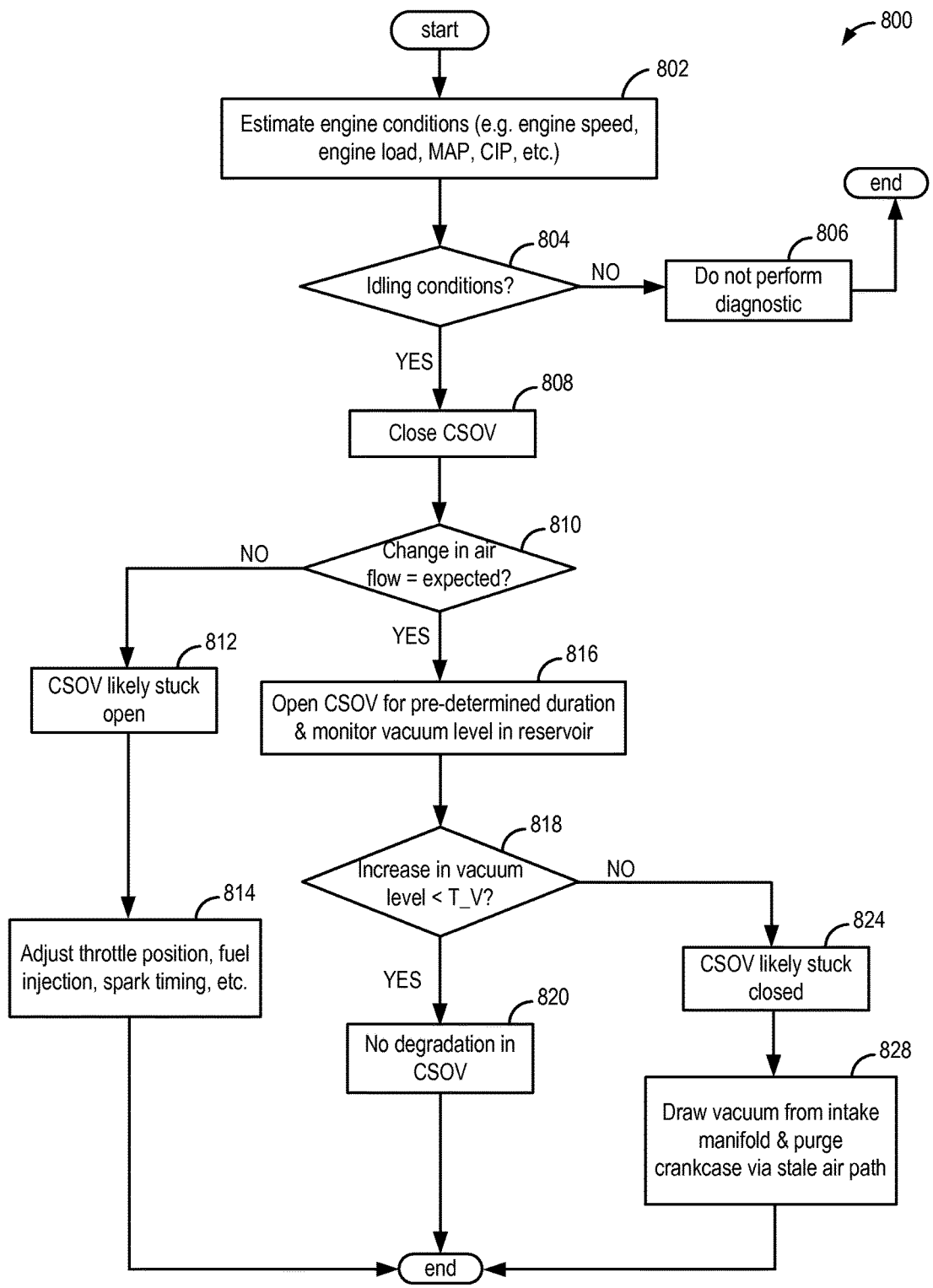
FIG. 8 portrays a high level flow chart for determining degradation of the CSOV.

Referring to FIG. 8, it shows an example routine 800 for diagnosing degradation of the CSOV, such as CSOV 24 of engine 10. Specifically, during idle conditions, the controller, such as controller 12, may alternate a position of the CSOV between fully closed and fully open. Further, resulting changes in air flow and/or vacuum levels in the brake booster may be employed to determine CSOV degradation. Though not shown, changes in engine speed, responsive to varying the position of the CSOV, may also be monitored to determine degradation of the CSOV.

At 802, routine 800 may estimate and/or measure existing engine operating conditions including vehicle conditions such as vehicle speed. Engine conditions may include engine speed, spark timing, air-fuel ratio, accelerator pedal position, engine load, MAP, etc. Next, at 804, routine 800 may confirm if the engine is idling. As described earlier in reference to 604 of routine 600, idling conditions may be determined based on one or more of engine speed being at idle speed, a fully released accelerator pedal, a depressed brake pedal, a retarded spark timing, throttle position, etc. For example, the engine may be determined to be idling when engine speed is considerably the same as a desired idle speed and the accelerator pedal is fully released. In another example, engine idle may be determined by engine speed being at idle speed, along with a retarded spark timing, and accelerator pedal in the completely released position.

If at 804, it is confirmed that idling conditions are not present, routine 800 proceeds to 806 where the diagnostic for the CSOV is not activated. Further routine 800 may end. However, if at 804 it is determined that the engine is idling, routine 800 continues to 808 wherein the CSOV is adjusted to a fully closed position from a fully open position in response to the idling conditions. Diagnosis of degradation may then be performed by monitoring a corresponding change in air flow rate. As such, air flow rate changes can be estimated based upon a position of the intake throttle, TIP, MAP, and throttle charge temperature (TCT). In addition, readings from a MAF sensor may also provide information regarding changes in air flow rate in response to closing the CSOV. By performing the diagnosis during idle conditions when air flow rate is lower, changes in air flow rate due to the closing of the CSOV may be detected relatively easily.

Next, at 810, routine 800 determines if the change in air flow rate is substantially equivalent to an expected change in air flow rate. For example, closing the CSOV may decrease the air flow received in the intake manifold. Herein, the MAP may be expected to reduce further upon closing the CSOV. Further, the intake throttle position may be adjusted to increase air flow into the intake manifold in response to closing the CSOV. If the change in air flow rate is not substantially equal to the expected change, routine 800 continues to 812 to diagnose the CSOV as being stuck open. For example, the position of the intake throttle may not change as expected. In the example of the change in MAP, the CSOV may be diagnosed to be stuck open if the MAP does not reduce as anticipated.

If the CSOV is diagnosed to be stuck open, at 814, routine 800 may adjust various engine parameters, at 814, to provide a desired engine torque. For example, during idle, as the throttle position is adjusted to a fully closed position, spark timing and fuel injection timing and/or fuel injection amount may be modified to reduce the engine torque.

The stuck open degradation condition of the CSOV may also be determined by monitoring changes in vacuum level in the brake booster or other vacuum reservoirs that receive vacuum from the aspirator. For example, when the CSOV is fully closed, vacuum levels in the vacuum reservoir may not rise. Accordingly, if after closing the CSOV, an increase in vacuum levels is observed, the CSOV may be diagnosed to be degraded e.g. stuck open.

Returning to 810, if it is determined that the change in air flow rate is substantially equal to the expected change in air flow rate, routine 800 proceeds to 816 to temporarily open the CSOV during engine idle. Herein, the CSOV is adjusted to the fully open position from a fully closed position, in one example. As such, the CSOV may be held fully open for a pre-determined duration, and the CSOV may be closed after completion of the pre-determined duration. For example, the CSOV may be actuated to its fully open position for 30 seconds. In another example, the CSOV may be held open for 60 seconds. By holding the CSOV open for the pre-determined duration, motive air may flow through the aspirator in the forward direction as the MAP is significantly lower than BP. This motive air flow through the aspirator may generate a vacuum that can be transferred to a vacuum reservoir, such as the reservoir in the brake booster. Further, degradation of the CSOV may be gauged by measuring vacuum levels in the vacuum reservoir during the pre-determined duration when the CSOV is held open. Thus, at 816, routine 800 may monitor vacuum levels in the vacuum reservoir (such as in the brake booster) during the pre-determined duration.

Accordingly, at 818, routine 800 confirms if an increase in vacuum level in the vacuum reservoir has occurred. Specifically, the increase in vacuum levels may be compared to an expected increase, T_V. For example, the controller may store data regarding an expected increase in vacuum levels in a vacuum reservoir when the CSOV is held fully open for the pre-determined duration. In one example, if the CSOV does not open to its fullest extent, e.g. when the CSOV is stuck between the fully closed and the fully open position, vacuum levels in the reservoir may increase but to a smaller extent than the expected increase, T_V. In another example, if the CSOV is stuck at its fully closed position, there may be no increase in vacuum levels.

Thus, if it is determined at 818 that a measured increase in vacuum levels is lower than the expected increase, T_V, routine 800 progresses to 824 to determine that the CSOV is likely stuck in the closed position. As mentioned above, the CSOV may be stuck at its fully closed position. Alternatively, the CSOV may be stuck between fully closed and fully open positions. Further, at 828, in response to the CSOV being determined as stuck closed, routine 800 may enable vacuum flow into the vacuum reservoir from the intake manifold. Further, as crankcase pressure rises, crankcase ventilation may occur along the stale air path. However, if at 818, the increase in vacuum levels is equal to the expected increase, T_V, routine 800 continues to 820 to determine that the CSOV is not degraded.

It will be appreciated that in addition to monitoring the change in vacuum levels at 816, routine 800 may also monitor changes in air flow rates as the CSOV is opened for the pre-determined duration. Herein, if an expected change in air flow rate is not observed, the CSOV may be determined to be stuck closed.

It will also be appreciated that the controller may command the changes in position of the CSOV, e.g., from fully closed to fully open, from fully open to fully closed, multiple times during engine conditions when such changes are permissible. By testing multiple times, degradation of the CSOV may be confirmed in a more reliable manner. If degradation of the CSOV is confirmed, the controller may activate a diagnostic trouble code (DTC) and a malfunction indicator lamp (MIL) may be activated.

In an alternative embodiment, degradation of the CSOV may be determined by adjusting the CSOV and the intake throttle simultaneously. For example, the CSOV may be opened and concurrently, the intake throttle may be closed to substantially the same degree or amount as the CSOV is opened. Thus, the CSOV and the intake throttle may be adjusted by equal amounts (or degrees) but in an opposite direction from each other. For example, if the opening of the CSOV is increased by a certain amount, the opening of the intake throttle may be decreased by the same certain amount. If there is no change observed in air flow rate, fuel flow rate, and/or engine speed, there may be no degradation of the CSOV. However, if there is a change in air flow rate, fuel flow rate, and/or engine speed, the CSOV may be degraded. Specifically, the CSOV may be stuck open or stuck closed. Since degradation of the intake throttle may be determined via the throttle position sensor, this diagnostic may be used for determining degradation of the CSOV alone.

Thus, an example method for a boosted engine may comprise adjusting, via an electronic controller, an opening of a common shut-off valve (CSOV) based on engine idling conditions, and each of a motive flow through an aspirator, and a crankcase ventilation flow from a crankcase, the motive flow and the crankcase ventilation flow combined together and flowing through the CSOV when the CSOV is open. The crankcase ventilation flow from the crankcase may be streamed through a crankcase ventilation (CV) valve based on engine conditions, the CV valve positioned upstream of the CSOV. Further, no other flow other than the motive flow and crankcase ventilation flow via the CV valve flows through the CSOV when the CSOV is open (e.g., fully open).

The adjusting may include decreasing the opening of the CSOV responsive to engine idling. The method may further comprise concurrently terminating each of the motive flow through the aspirator and the crankcase ventilation flow via the CV valve by closing the CSOV without adjusting any other valves via the electronic controller. The adjusting may also include increasing the opening of the CSOV in response to a non-idling condition of the boosted engine. The method may further comprise receiving each of the motive flow through the aspirator and crankcase ventilation flow from the crankcase via the CV valve together into an intake manifold when intake manifold pressure is lower than compressor inlet pressure (CIP). Herein, the CSOV may concurrently stream aspirator motive flow and crankcase ventilation flow via the CV valve into the intake manifold. As mentioned earlier in reference to FIG. 4, no other flows may stream through the CSOV when the CSOV is opened and when the manifold pressure is lower than CIP. The method may also comprise drawing vacuum at a neck of the aspirator and applying the vacuum to a vacuum consumption device. Further, the method may include ceasing crankcase ventilation flow from the crankcase via the crankcase ventilation (CV) valve into the intake manifold when intake manifold pressure is higher than compressor inlet pressure. In addition, the method may comprise streaming motive flow through the aspirator from the intake manifold to an inlet of a compressor when intake manifold pressure is higher than the compressor inlet pressure. In this condition, only air flow towards the aspirator may stream through the CSOV (as shown in FIG. 5). No other flow may stream through the CSOV when manifold pressure is higher than CIP. Further still, the method may comprise adjusting engine operation in response to degradation of the CSOV, the degradation determined via the electronic controller in response to one of a lack of change in air flow, and an increase in vacuum level being lower than an expected increase during a commanded change in an opening state of the CSOV.

In this way, a common shut-off valve (CSOV) controlling each of a CV flow as well as an aspirator motive flow may be closed to cease supplementary air ingestion in an engine during idle conditions. Since additional air flow from passive devices such as the aspirator and the CV valve is eliminated, engine idle may be maintained at significantly low fueling rates. Therefore, the CSOV may enable a lower fuel consumption in the engine. Further, a size of the aspirator may be increased to provide higher amounts of vacuum to vacuum consumers. In addition, a size of a low flow orifice in the CV valve may also be enlarged such that CV flow occurs during deeper vacuum levels in the engine intake manifold. Overall, the crankcase may be ventilated sufficiently while reducing fuel consumption, thus, providing an improved engine performance.

In an additional representation, a method for a boosted engine is provided comprising, during engine idle, commanding a change in a position of a common shut-off valve (CSOV) via an electronic controller, and determining degradation of the CSOV based on an expected response in engine conditions to the commanded change in position of the CSOV. Herein, the CSOV may regulate each of a motive flow through an aspirator and a crankcase ventilation flow from a crankcase via a crankcase ventilation (CV) valve. Further, the motive flow through the aspirator may generate a vacuum, the vacuum being supplied to a vacuum reservoir. The change in position commanded by the electronic controller, in one example, may be a fully closed position of the CSOV. Herein, the CSOV may be determined to be degraded when a measured change in air flow rate in response to the fully closed position of the CSOV is substantially different from an expected change in air flow rate. In another example, the change in position commanded by the electronic controller may be a fully open position of the CSOV. Further, the fully open position of the CSOV may be maintained for a pre-determined duration. Herein, the CSOV may be determined to be degraded when a measured increase in vacuum levels in the vacuum reservoir in response to the fully open position of the CSOV is lower than an expected increase in vacuum levels.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a boosted engine, comprising:
adjusting, via an electronic controller, an opening of a common shut-off valve (CSOV) based on and maintaining engine idling conditions, and each of a motive flow through an aspirator, and a crankcase ventilation flow from a crankcase, the motive flow and the crankcase ventilation flow combined together at a junction between the aspirator and an intake manifold and flowing through the CSOV when the CSOV is open.

2. The method of claim 1, wherein the junction is positioned in a first passage in parallel with a second passage coupling a compressor outlet to the intake manifold, wherein the crankcase ventilation flow from the crankcase is streamed through a crankcase ventilation (CV) valve, the CV valve positioned upstream of the CSOV, and wherein no other flow other than the motive flow and crankcase ventilation flow via the CV valve flows through the CSOV when the CSOV is open.

3. The method of claim 2, wherein the adjusting includes decreasing the opening of the CSOV responsive to engine idling, and wherein a throttle is positioned in the second passage.

4. The method of claim 3, further comprising concurrently terminating each of the motive flow through the aspirator and the crankcase ventilation flow via the CV valve by closing the CSOV without adjusting any other valves via the electronic controller.

5. The method of claim 2, wherein the adjusting includes increasing the opening of the CSOV in response to a non-idling condition of the boosted engine, and wherein motive flow through the aspirator draws gas from a brake booster.

6. The method of claim 5, further comprising receiving each of the motive flow through the aspirator and crankcase ventilation flow via the CV valve together into the intake manifold when intake manifold pressure is lower than compressor inlet pressure, and further comprising, drawing vacuum at a neck of the aspirator and applying the vacuum to a vacuum consumption device.

7. The method of claim 6, further comprising ceasing crankcase ventilation flow from the crankcase via the CV valve into the intake manifold when intake manifold pressure is higher than compressor inlet pressure.

8. The method of claim 7, further comprising streaming motive flow through the aspirator from the intake manifold to an inlet of a compressor when intake manifold pressure is higher than the compressor inlet pressure.

9. The method of claim 1, further comprising adjusting engine operation in response to degradation of the CSOV, the degradation determined via the electronic controller in response to one of a lack of change in air flow, and an increase in vacuum level being lower than an expected increase during a commanded change in an opening state of the CSOV.

10. A system for an engine, comprising:
an engine intake manifold;
a crankcase coupled fluidically to the engine intake manifold via a crankcase ventilation (CV) valve and a common shut-off valve (CSOV);
an intake throttle;
a boost device including a compressor positioned in an intake passage upstream of the intake throttle;
an aspirator positioned across each of the compressor and the intake throttle, the aspirator coupled to a vacuum consumption device;
a motive inlet of the aspirator fluidically coupled to the intake passage upstream of the compressor;
a motive outlet of the aspirator fluidically coupled to the engine intake manifold, downstream of the intake throttle, via the CSOV;
the motive outlet joining an outlet of the CV valve at a junction between the aspirator and the engine intake manifold, the junction in a passage positioned in parallel with the intake passage, the intake throttle positioned in the intake passage; and
a controller configured with computer readable instructions stored on non-transitory memory to:
adjust the CSOV to a fully closed position in response to engine idle; and
discontinue each of motive flow through the aspirator and CV flow through the CV valve synchronously.

11. The system of claim 10, wherein the controller includes further instructions to adjust the CSOV to a fully open position when the engine is not idling.

12. The system of claim 11, wherein each of the motive flow through the aspirator and the CV flow through the CV valve is received together in the engine intake manifold when pressure in the engine intake manifold is lower than a pressure at an inlet of the compressor.

13. The system of claim 12, wherein motive flow through the aspirator includes air flow from the inlet of the compressor to the engine intake manifold, and wherein CV flow through the CV valve includes blow-by gases from the crankcase.

14. The system of claim 11, wherein when pressure in the engine intake manifold is higher than pressure at an inlet of the compressor, motive flow through the aspirator includes air flow from the engine intake manifold to the inlet of the compressor.

15. The system of claim 14, wherein CV flow through the CV valve is ceased when pressure in the engine intake manifold is higher than the pressure at the inlet of the compressor.

16. A method for a boosted engine, comprising:
during a first condition,
increasing an opening of a common shut-off valve (CSOV);
flowing motive air through an aspirator from a compressor inlet to an intake manifold via the CSOV to draw vacuum from a vacuum consumption device separate from a crankcase; and
drawing blow-by gases from the crankcase through a crankcase ventilation (CV) valve and the CSOV into the intake manifold; and
during a second condition,
decreasing the opening of the CSOV;
discontinuing motive air flow through the aspirator; and
ceasing drawing of blow-by gases from the crankcase via the CV valve and the CSOV into the intake manifold.

17. The method of claim 16, wherein the first condition includes an intake manifold pressure lower than a compressor inlet pressure and a non-idling condition of the boosted engine, and wherein the second condition includes an engine idle condition.

18. The method of claim 17, further comprising, during a third condition, increasing the opening of the CSOV, flowing motive air through the aspirator from the intake manifold to the compressor inlet, and not receiving blow-by gases from the crankcase through the CV valve and the CSOV into the intake manifold.

19. The method of claim 18, wherein the third condition includes the intake manifold pressure being higher than the compressor inlet pressure and the non-idling condition of the boosted engine.

20. The method of claim 19, further comprising generating a vacuum at the aspirator due to motive air flow during each of the first condition and the third condition and applying the vacuum to the vacuum consumption device, and wherein the vacuum consumption device includes one of a brake booster, a fuel vapor canister, and a vacuum reservoir.

21. A method for a boosted engine, comprising:
adjusting, via an electronic controller, an opening of a common shut-off valve (CSOV) based on engine idling conditions, a motive flow through an aspirator and a crankcase ventilation flow from a crankcase combined together at a junction and flowing through the CSOV when the CSOV is open, the junction between the aspirator and an intake manifold, the aspirator drawing vacuum from a brake booster.

* * * * *